(12) United States Patent
Tsujimoto et al.

(10) Patent No.: US 7,686,559 B2
(45) Date of Patent: Mar. 30, 2010

(54) ARTICLE TRANSPORT FACILITY AND A METHOD OF OPERATING THE FACILITY

(75) Inventors: Kazushi Tsujimoto, Gamo-gun (JP); Yuichi Ueda, Gamo-gun (JP); Kunihiro Tsukamoto, Gamo-gun (JP)

(73) Assignee: Daifuku Co., Ltd., Osaka (JP)

( * ) Notice: Subject to any disclaimer, the term of this patent is extended or adjusted under 35 U.S.C. 154(b) by 13 days.

(21) Appl. No.: 11/440,690

(22) Filed: May 25, 2006

(65) Prior Publication Data

US 2006/0276930 A1 Dec. 7, 2006

(30) Foreign Application Priority Data

May 31, 2005 (JP) ............................. 2005-158847
Feb. 9, 2006 (JP) ............................. 2006-032432

(51) Int. Cl.
*B65G 1/00* (2006.01)
(52) U.S. Cl. ..................... 414/273; 414/801; 700/214
(58) Field of Classification Search .................. None
See application file for complete search history.

(56) References Cited

U.S. PATENT DOCUMENTS

| | | | | |
|---|---|---|---|---|
| 4,286,911 A | * | 9/1981 | Benjamin | 414/273 |
| 4,815,190 A | * | 3/1989 | Haba et al. | 29/430 |
| 5,894,461 A | * | 4/1999 | Fosler et al. | 369/30.31 |
| 6,304,524 B1 | * | 10/2001 | Gallo et al. | 369/30.28 |
| 6,438,459 B1 | * | 8/2002 | Dimitri et al. | 700/255 |
| 6,968,257 B2 | * | 11/2005 | Ngo | 700/214 |
| 7,231,278 B2 | * | 6/2007 | Ngo | 700/213 |
| 2002/0017433 A1 | * | 2/2002 | Nakashima et al. | 187/249 |
| 2005/0113965 A1 | * | 5/2005 | Ngo | 700/214 |

FOREIGN PATENT DOCUMENTS

EP    1 512 661 A1   9/2004
JP    11059819       3/1999

* cited by examiner

*Primary Examiner*—Saúl J Rodríguez
*Assistant Examiner*—Joshua I Rudawitz
(74) *Attorney, Agent, or Firm*—The Webb Law Firm

(57) ABSTRACT

An article transport facility includes a plurality of mobile bodies movable along a single track for transporting articles, and a control device for controlling movement of the mobile bodies. The control device is capable of executing a joint moving operation for moving the mobile bodies in combination. In this operation, a first mobile body which is one of the mobile bodies pushes a second mobile body which is another of the mobile bodies.

6 Claims, 21 Drawing Sheets

1st individual storing operation

2nd individual storing operation

2nd individual delivering operation

ARTICLE TRANSPORT FACILITY AND A METHOD OF OPERATING THE FACILITY

BACKGROUND OF THE INVENTION

This invention relates to an article transport facility, and more particularly to an article transport facility having a plurality of mobile bodies movable forward and backward along a single track for transporting articles, and a control means for controlling operation of the mobile bodies. The invention relates also to a method of operating the facility.

The above article transport facility transports articles by reciprocal movement of each of the mobile bodies along a track. This facility realizes improved transport capacity by transporting articles with the plurality of mobile bodies.

A conventional article transport facility as noted above has two mobile bodies for moving forward and backward along the track. The control means is provided for controlling operation of the two mobile bodies to move and transport articles as separated from each other at least by a predetermined distance (see Japanese Patent Publication (Unexamined) H11-59819, for example).

In the conventional article transport facility, when the distance between the two mobile bodies moved in transporting articles becomes less than the predetermined distance, the two mobile bodies are stopped to avoid a collision.

Thus, the above conventional article transport facility, when moving the plurality of mobile bodies for article transport, does not permit the distance between the two mobile bodies adjoining longitudinally of the track to become less than the predetermined distance. In this case, there is a possibility that the plurality of mobile bodies cannot move efficiently for article transport.

When, for example, the two mobile bodies are moved in order to transport articles to two locations close to each other longitudinally of the track, the two mobile bodies are moved close to each other. When the distance between the two mobile bodies becomes less than the predetermined distance, the mobile bodies are stopped. Therefore, the mobile bodies cannot be moved efficiently for article transport. When an abnormality occurs with one of the mobile bodies, the abnormal mobile body cannot be moved by using the normal mobile body.

When the two mobile bodies standing still close to each other longitudinally of the track are moved to transport articles, for example, the mobile body located forward is first moved. The rearward mobile body is moved only after the two mobile bodies become spaced apart by the predetermined distance, In this way, it is necessary to perform a operation for making the distance between the two mobile bodies at least the predetermined distance, Thus, the plurality of mobile bodies cannot be moved efficiently for article transport.

In order to eliminate the above inconvenience, for example, a coupling device may be provided for coupling the two mobile bodies. When moving the two mobile bodies for article transport, the two mobile bodies may be coupled by the coupling device to move together. In this case, however, the coupling device must be attached to and detached from the mobile bodies manually. This operation is time-consuming, and consequently the plurality of mobile bodies cannot be moved efficiently for article transport.

In order to move the two mobile bodies together for article transport, it is also conceivable to attach a coupling device with an actuator to the mobile bodies, so that the mobile bodies are coupled by operation of the actuator. In this case, the coupling device with the actuator must newly be provided for the mobile bodies, resulting in a complicated construction.

SUMMARY OF THE INVENTION

This invention has been made having regard to the prior at noted above, and its object is to provide an article transport facility which can move a plurality of mobile bodies for article transport efficiently, while attaining a simplified construction.

The above object is fulfilled, according to this invention, by an article transport facility comprising:

a plurality of mobile bodies movable along a single track for transporting articles; and a control means for controlling movement of the mobile bodies, the control means being capable of executing a joint moving operation for moving the mobile bodies in combination, in which a first mobile body which is one of the mobile bodies pushes a second mobile body which is another of the mobile bodies.

With the control means executing the joint moving operation, as noted above, for moving the mobile bodies in combination, in which one mobile body pushes and moves the other. Thus, even when the distance between the two adjoining mobile bodies becomes less than a predetermined distance, it is possible to transport articles or to perform a moving operation.

The plurality of mobile bodies can be moved together for article transport without adding a new construction to the mobile bodies, and only by adding a control feature to the control means for performing the joint moving operation.

DETAILED DESCRIPTION OF PREFERRED EMBODIMENTS

Preferred embodiments of this invention will be described hereinafter with reference to the accompanying drawings.

In the following embodiment, an article transport facility according to this invention is adapted for an article storage facility. While a plurality of embodiments are described hereinafter, a combination of a feature from one embodiment different and a feature from another is also considered to be within the scope of this invention in the absence of serious confliction.

Figure 1:
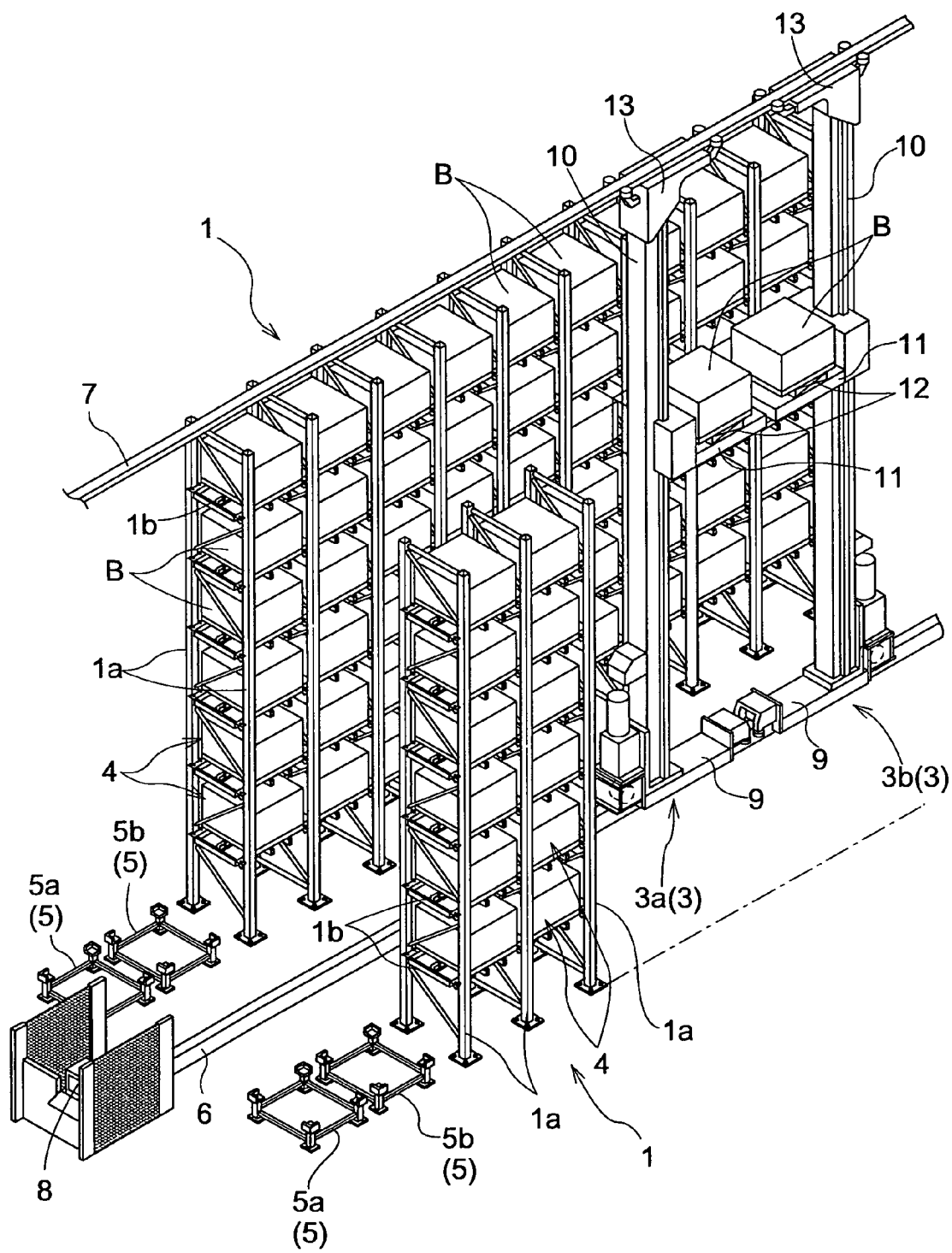
FIG. 1 is a perspective view of an article storage facility in a first embodiment.

An article storage facility in a first embodiment, as shown in FIG. 1, includes two article storage racks 1 installed with a space in between, and with opposed open front planes thereof for loading and unloading articles B, and stacker cranes 3 as article transporting mobile bodies automatically movable forward and backward along a running passage 2 formed between the two article storage racks 1.

Each article storage rack 1 has pairs of front and rear struts 1a erected at interval in the direction of width of the rack (horizontal direction). Each pair of front and rear struts 1a has a plurality of supports 1b extending in the direction of width of the rack and arranged at intervals in the vertical direction.

Each article storage rack 1 has a plurality of storage units 4 arranged vertically and in the direction of width of the rack. Each storage unit 4 stores an article B as placed on the support 1b.

The storage units 4 have substantially the same width in the direction of width of the rack. The article storage racks 1 are constructed to store one article B in each storage unit 4.

Load support tables 5 are installed adjacent an end in the direction of width of each article storage rack 1 for receiving articles B to be stored in the article storage rack 1 and articles B delivered from the article storage rack 1.

Between the two article storage racks 1 is a rail track 6 laid on the floor to extend over an entire horizontal range of the article storage racks 1 and the load support tables 5 for storage and delivery. A guide rail 7 is disposed overhead to extend over the entire horizontal range of the article storage racks 1 and the load support tables 5 for storage and delivery. The stacker cranes 3 are movable horizontally on the rail track 6 while being guided by the guide rail 7.

A ground controller 8 is disposed at the end adjacent the load support tables 5 of the rail track 6 to act as control means for controlling operation of the stacker cranes 3. The ground controller 8 controls also storage information concerning which articles B are stored in which storage units 4. However, the control means is not limited to the ground controller and may be located on the movie bodies, a storage rack, or at any other location. Also, two or more controller units located in one or more locations may cooperate with one another to function as the control means.

Figure 2:
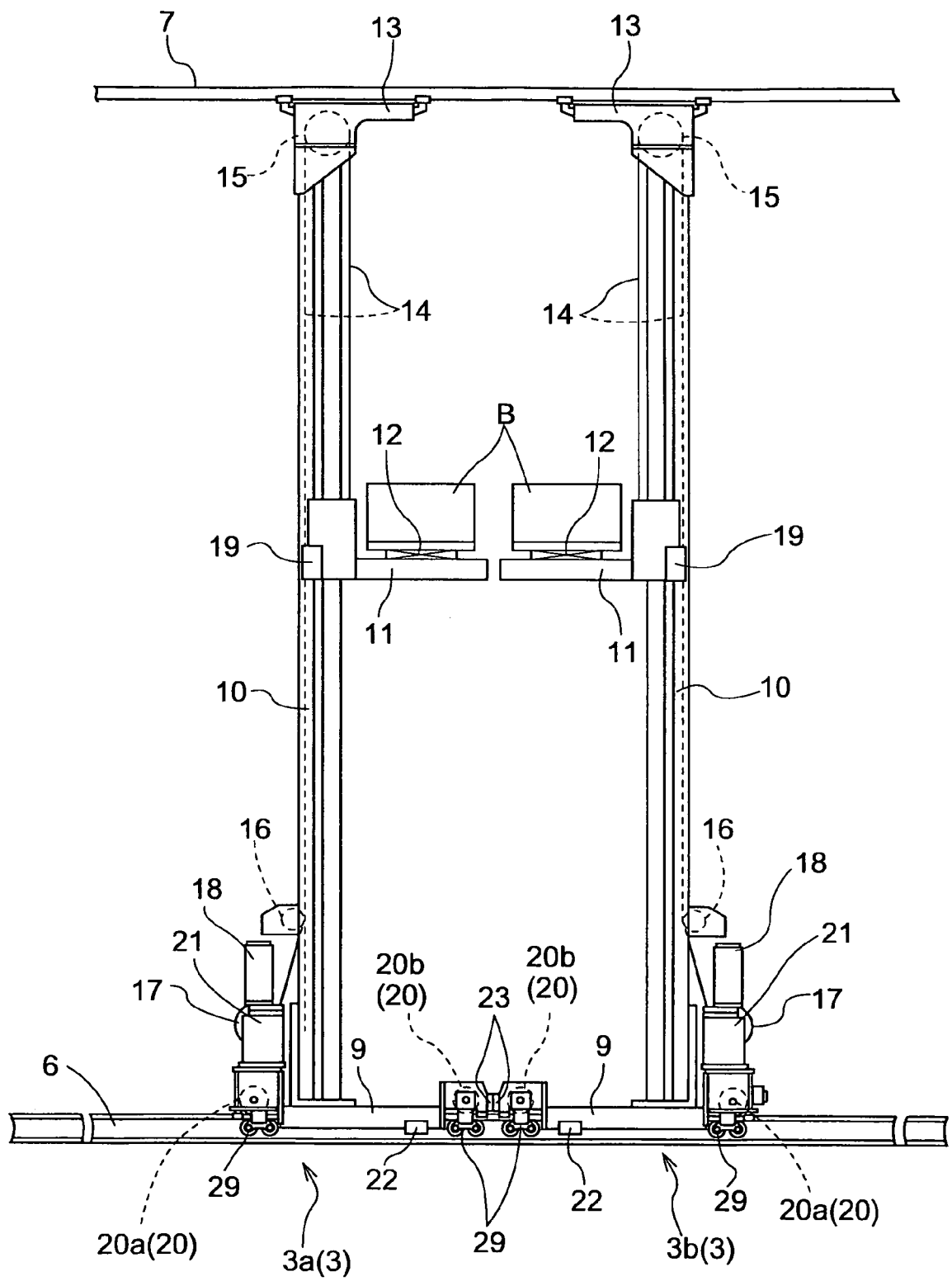
FIG. 2 is a side elevation of stacker cranes in the first embodiment.

Two stacker cranes 3 are provided as arranged longitudinally of the rail track 6. As shown in FIG. 2, each of the two stacker cranes 3 includes a carriage 9 acting as a running member for running along the rail track 6, a lift unit 11 vertically movable along a vertical mast 10 erected on the carriage 9, and an electromotive article transfer device 12 (e.g. a fork-type article transfer device) mounted on the lift unit 11.

Each of the two stacker cranes 3, through a running operation of the carriage 9, a lifting operation of the lift unit 11 and a transfer operation of the article transfer device 12, stores an article B placed on a load support table 5 for storage and delivery in a storage unit 4 of an article storage rack 1, or delivers an article B stored in a storage unit 4 of an article storage rack 1 to a load support table 5 for storage and delivery.

As shown in FIG. 1, two load support tables 5 for storage and delivery are arranged in the direction of horizontal movement of the stacker cranes 3. The load support tables 5 are arranged so that the article transfer devices 12 of the two stacker cranes 3 lying side by side in the direction of horizontal movement can transfer articles B to/from the load support tables 5.

In this embodiment, of the two stacker cranes 4, the one located adjacent the load support tables 5 is regarded as the first stacker crane 3a, and the one located adjacent the article storage racks 1 as the second stacker crane 3b.

Of the two load support tables 5 arranged in the direction of horizontal movement of the stacker cranes 3, the one located remote from the article storage racks 1 is regarded as the first load support table 5a, and the one located close to the article storage racks 1 as the second load support table 5b.

The first stacker crane 3a performs article transport between the first load support table 5a and article storage racks 1. The second stacker crane 3b performs article transport between the second load support table 5b and article storage racks 1.

Each of the two stacker cranes 3 has a single vertical mast 10. This single vertical mast 10 is erected on an end region of the carriage 9 remote from the other stacker crane 3.

The vertical mast 10 has an upper frame UF attached to an upper end thereof to be guided by the guide rail 7.

The lift unit 11 is vertically movably supported by the vertical mast 10 erected on the carriage 9, and is suspended with a lift wire 14.

The lift wire 14 is wound around a guide pulley 15 attached to the upper frame UF and a guide pulley 16 attached to the vertical mast 10, and is connected to a take-up drum 17 disposed at an end of the carriage 9.

The take-up drum 17 is rotatable backward and forward by a lifting electric motor 18 which is an inverter type motor. Thus, the lift unit 11 is vertically movable by winding and unwinding of the lift wire 14.

The lift unit 11 has a lifting rotary encoder 19 for detecting a position in the vertical direction of the lift unit 11. Although not shown, the lifting rotary encoder 19 includes a rotary shaft having a sprocket meshed with a chain extending longitudinally of the vertical mast 10. Thus, the lifting rotary encoder 19 detects a position in the vertical direction of the lift unit 11 from a distance of vertical movement.

In each of the two stacker cranes 3, the carriage 9 has a pair of front and rear wheels 20 spaced apart longitudinally of the rail track 6.

Each of the front and rear wheels 20 has a backup roller 29 for contacting the rail track 6 from below. The backup roller 29 contacts the rail track 6 to restrict upward movement, thereby restricting the wheel 20 levitating from the rail track 6.

A propelling electric motor 21 is provided for driving the wheel 20a, located remote from the other stacker crane 3, of the pair of front and rear wheels 20. Thus, this wheel 20a is constructed as a propelling wheel. The wheel 20b located close to the other stacker crane 3, of the pair of front and rear wheels 20, is constructed as a freely rotatable driven wheel.

The carriage 9 has a running rotary encoder 22 for detecting a running position of the carriage 10 in the horizontal direction. Although not shown, the running rotary encoder 22 includes a rotary shaft having a sprocket meshed with a chain extending longitudinally of the rail track 6. Thus, the running rotary encoder 22 detects a running position in the horizontal direction of the carriage 9 from a running distance of the carriage 9.

A bumper 23 is provided at the end of the carriage 9 close to the other stacker crane 3

Figure 3:
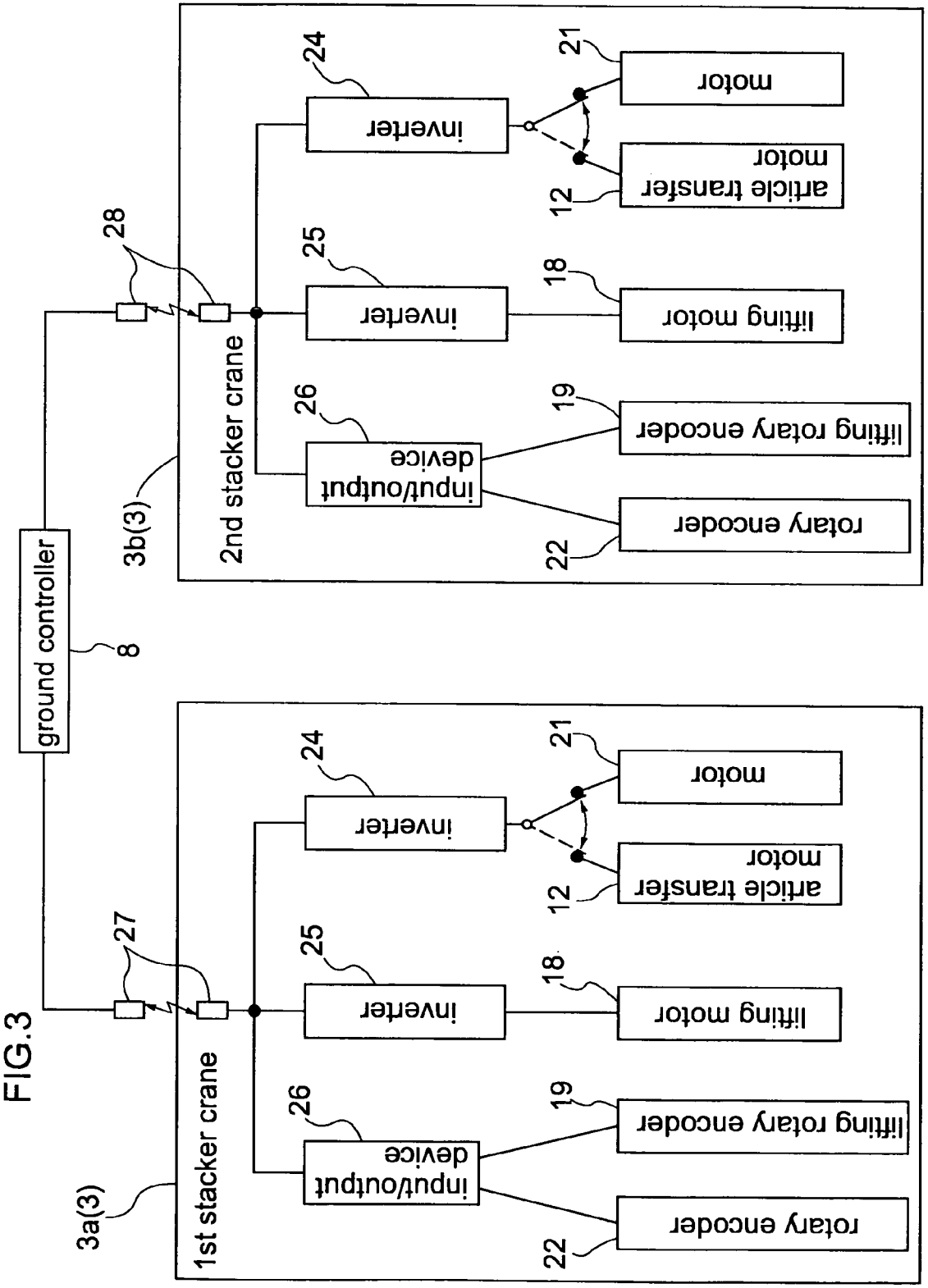
FIG. 3 is a control block diagram of the article storage facility in the first embodiment.

Each of the two stacker cranes 3, as shown in FIG. 3, includes a running inverter 24 for actuating the running electric motor 21 or the article transfer device 12, a lifting inverter 25 for actuating the lifting electric motor 18, and an input/output device 26 capable of outputting detection information from the lifting rotary encoder 19 and running rotary encoder 22.

The ground controller 8 controls operation of the running inverters 24 and lifting inverters 25 to control operation of the two stacker cranes 3. A communication controller (not shown) is provided for each of the ground controller 8, the running inverter 24 and lifting inverter 25 of each of the two stacker cranes 3, and the input/output device 26. Further, a first optical transmission device 27 is provided for transmitting information between the ground controller 8 and first stacker crane 3a, and a second optical transmission device 28 for transmitting information between the ground controller 8 and second stacker crane 3b. The first optical transmission device 27 and second optical transmission device 28 transmit and receive information through optical transmission between an optical transmission device disposed at an end of the rail track 6 and optical transmission devices provided for the stacker cranes 3.

The communication controllers provided for the ground controller 8, running inverters 24, lifting inverters 25 and input/output device 26, first optical transmission device 27 and second optical transmission device 28 constitute a communication network. In the communication network, the ground controller 8 acts as the master, and the running inverters 24, lifting inverters 25 and input/output device 26 as slaves.

The ground controller 8 is constructed to control positions of the first stacker crane 3a and second stacker crane 3b in the horizontal direction through the communication network, based on information received from the input/output device 26, While controlling positions of the first stacker crane 3a and second stacker crane 3b in the horizontal direction, the ground controller 8 transmits various types of command information to the first stacker crane 3a and second stacker crane 3b through the communication network to control operation of the first stacker crane 3a and second stacker crane 3b.

The ground controller 8 controls the running operation of the carriage 9 and the lifting operation of the lift unit 11 to move the article transfer device 12 to a rack-side article transfer position corresponding to each of the plurality of storage units 4 and to a storage- and delivery-side article transfer position corresponding to each of the load support tables 5. The ground controller 8 controls also the transfer operation of the article transfer device 12 to transfer articles to or from each storage unit 4 and each load support table 5 in the rack-side article transfer position and storage- and delivery-side article transfer position.

To describe this further, each of the rack-side article transfer position and storage- and delivery-side article transfer position is a position determined from a target lifting stop position and a target running stop position. A storage- and delivery-side article transfer position is set for each of the plurality of load support tables 5. A target lifting stop position and a target running stop position are set for each of the plurality of load support tables 5. A rack-side article transfer position is set for each of the plurality of storage units 4. A target lifting stop position and a target running stop position are set for each of the plurality of storage units 4.

The ground controller 8 performs a running control for running the carriage 9 and a lifting control for vertically moving the lift unit 11 to move the article transfer device 12 to a rack-side article transfer position for a target storage unit 4 or to a storage- and delivery-side article transfer position for a target load support table 5. The ground controller 8 performs also a transfer control for operating the article transfer device 12 to transfer articles to and from the storage unit 4 and load support table 5.

The running control will be described.

The ground controller 8 transmits run command information to the running inverter 24 through the communication network. Based on the run command information, the running inverter 24 switches to a state of operating the running electric motor 21, and controls operation of the running electric motor 21. As a result, the carriage 9 runs to a target running stop position in the article transfer position corresponding to a target storage unit 4 or load support table 5.

Specifically, upon lapse of each set time, the ground controller 8 transmits, as the run command information, running speed command information specifying a target speed to the running inverter 24 through the communication network. The running inverter 24 adjusts a current value applied to the running electric motor 21 so that the running speed of the carriage 9 may become the target speed specified by the running speed command information. As a result, the carriage 9 runs at the target speed specified by the running speed command information.

When the carriage 9 reaches the target running stop position in the article transfer position corresponding to the target storage unit 4 or load support table 5, the ground controller 8 transmits running stop command information as running command information to the running inverter 24 through the communication network. Based on the running stop command information, the running inverter 24 stops the operation of the running electric motor 21 to brake and stop the carriage 9 at the target running stop position.

The lifting control will be described next.

The ground controller 8 transmits lifting command information to the lifting inverter 25 through the communication network. Based on the lifting command information, the lifting inverter 25 controls operation of the lifting electric motor 18 to move the lift unit 11 vertically to a target lifting stop position in the article transfer position corresponding to the target storage unit 4 or load support table 5.

Specifically, upon lapse of each set time, the ground controller 8 transmits, as the lifting command information, lifting speed command information specifying a target speed to the lifting inverter 25 through the communication network. The lifting inverter 25 adjusts a current value applied to the lifting electric motor 18 so that the vertical moving speed of the lift unit 11 may become the target speed specified by the lifting speed command information. As a result, the lift unit 11 vertically moves at the target speed specified by the lifting speed command information.

When the lift unit 11 reaches the target lifting stop position in the article transfer position corresponding to the target storage unit 4 or load support table 5, the ground controller 8 transmits lifting stop command information as lifting command information to the lifting inverter 25 through the communication network. Based on the lifting stop command information, the lifting inverter 25 stops the operation of the lifting electric motor 18 to brake and stop the lift unit 9 at the target lifting stop position.

The transfer control will be described next.

With the carriage 9 standing still in the target running stop position, and the lift unit 11 standing still in the target lifting stop position, the ground controller 8 transmits transfer command information to the running inverter 24 through the communication network, Based on the transfer command information from the grounder controller 8, the running inverter 24 switches to a state of operating the article transfer device 12, and controls operation of the article transfer device 12 for article transfer.

An operation under the transfer control will be described where the article transfer device 12 is a fork-type article transfer device.

When picking up an article B from the storage unit 4 or load support table 5, the fork is projected, the lift unit 11 is raised to scoop up the article B from the storage unit 4 or load support table 5, and then the fork is retracted.

When depositing the article B on the storage unit 4 or load support table 5, the fork carrying the article B is projected, the lift unit 11 is lowered to deposit the article B on the storage unit 4 or load support table 5, and then the fork is retracted.

Thus, the fork-type article transfer device transfers the article B to/from the storage unit 4 or load support table 5 through projection and retraction of the fork and vertical movement of the lift unit 11. The article transfer positions include the position for scooping the article B, and the position for depositing the article B. The article transfer position for depositing is set higher than the article transfer position for scooping.

The ground controller 8 can carry out operations for transporting articles B including a storing operation for storing an article B placed on a load support table 5 for storage and delivery in a storage unit 4 of an article storage rack 2, and a delivering operation for taking an article B stored in a storage unit 4 of an article storage rack 1 out to a load support table 5 for storage and delivery.

The ground controller 8 can carry out three types of storing operation including a simultaneous storing operation, a first individual storing operation and a second individual storing operation, and three types of delivering operation including a simultaneous delivering operation, a first individual delivering operation and a second individual delivering operation.

In performing article transport in the storing operation and delivering operation, the ground controller 8 controls operation of the two stacker cranes 3 in a way to avoid interference between a location of transfer for the first stacker crane 3*a* and a location of transfer for the second stacker crane 3*b*.

Each operation will be described hereinafter with reference to FIGS. 4 through 9.

First, the simultaneous storing operation will be described with reference to FIG. 4. In the simultaneous storing operation, the two stacker cranes 3, i.e. the first stacker crane 3*a* and second stacker crane 3*b*, simultaneously perform article transport for storing articles B.

When carrying out the simultaneous storing operation, articles B are placed on both the first load support table 5*a* and second load support table 5*b*. Of the two articles B, the article B to be stored in a deeper position on the article storage rack 2 is placed on the second load support table 5*b*.

The ground controller 8 performs the running control, lifting control and transfer control for each of the first stacker crane 3*a* and second stacker crane 3*b*. First, as shown in dotted lines in FIG. 4, the two article transfer devices 12 of the first stacker crane 3*a* and second stacker crane 3*b* are placed in the storage- and delivery-side article transfer positions. The article transfer devices 12 receive the articles B from the load support tables 5.

Figure 4:
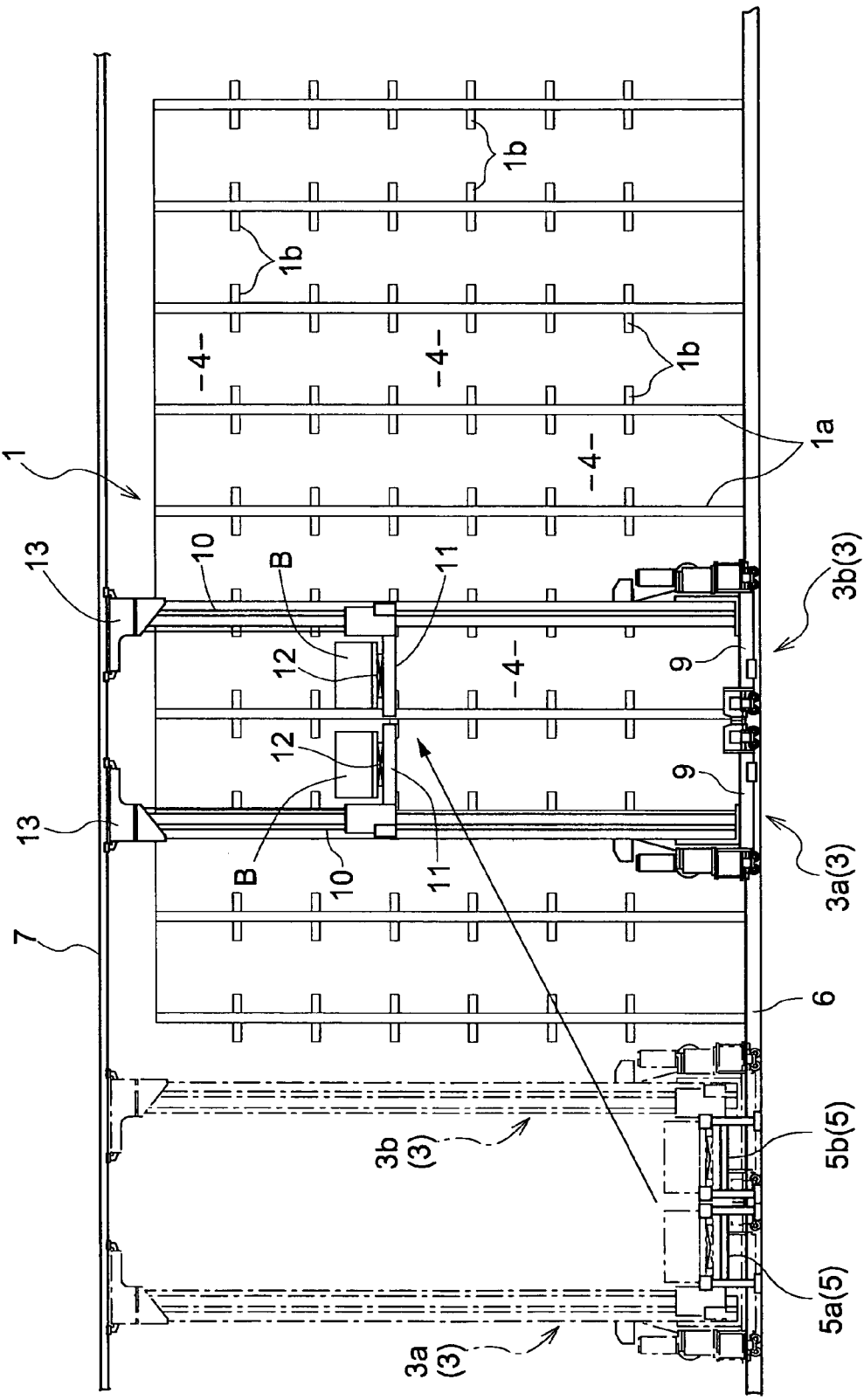
FIG. 4 is a view showing an operation in a simultaneous storing operation in the first embodiment.

Next, the ground controller 8 performs the running control, lifting control and transfer control for each of the first stacker crane 3*a* and second stacker crane 3*b* for moving the two article transfer devices 12 of the first stacker crane 3*a* and second stacker crane 3*b* having received the articles B, to rack-side article transfer positions corresponding to the storage units 4 that are to store the articles B, as shown in solid lines in FIG. 4. The articles B are transferred to and stored in the storage units 4.

Regarding the storage units 4 for storing the received articles B, the first stacker crane 3*a* accesses the storage unit 4 closer to the support tables 5 for storage and delivery, with respect to the direction of horizontal movement of the stacker cranes 3, than the storage unit 4 accessed by the second stacker crane 3*b*.

Next, the first individual storing operation will be described with reference to FIG. 5. In the first individual storing operation, of the two stacker cranes 3, the first stacker crane 3*a* located adjacent the load support tables 5 for storage and delivery performs article transport for storing an article B.

The ground controller 8 performs the running control, lifting control and transfer control for first stacker crane 3*a*. First, as shown in a dotted line in FIG. 5, the article transfer device 12 of the first stacker crane 3*a* is placed in the storage- and delivery-side article transfer position. The article transfer device 12 receives the article B from the load support table 5.

Figure 5:
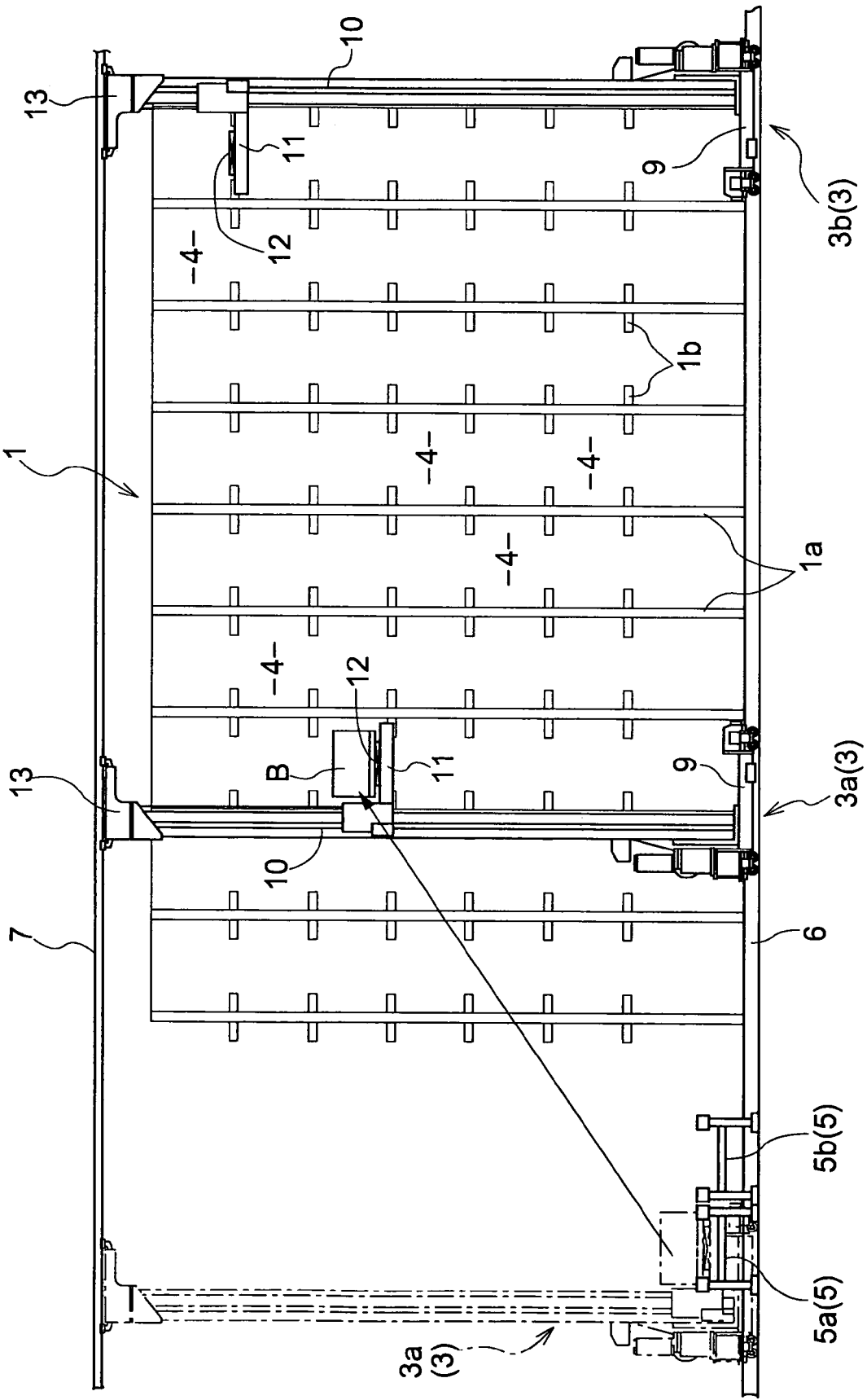
FIG. 5 is a view showing an operation in a first individual storing operation in the first embodiment.

Next, the ground controller 8 performs the running control, lifting control and transfer control for the first stacker crane 3*a* for moving the article transfer device 12 of the first stacker crane 3*a* having received the article B, to a rack-side article transfer position corresponding to the storage unit 4 that should store the article B, as shown in solid lines in FIG. 5. The article B is transferred to and stored in the storage unit 4.

The ground controller 8 controls operation of the second stacker crane 3*b* in order to retreat out of interference with the article transport by the first stacker crane 3*a*. In FIG. 5, the current position of the second stacker crane 3*b* does not interfere with the article transport by the first stacker crane 3*a*. Thus, the second stacker crane 3*b* is kept on standby in that position.

Figure 6:
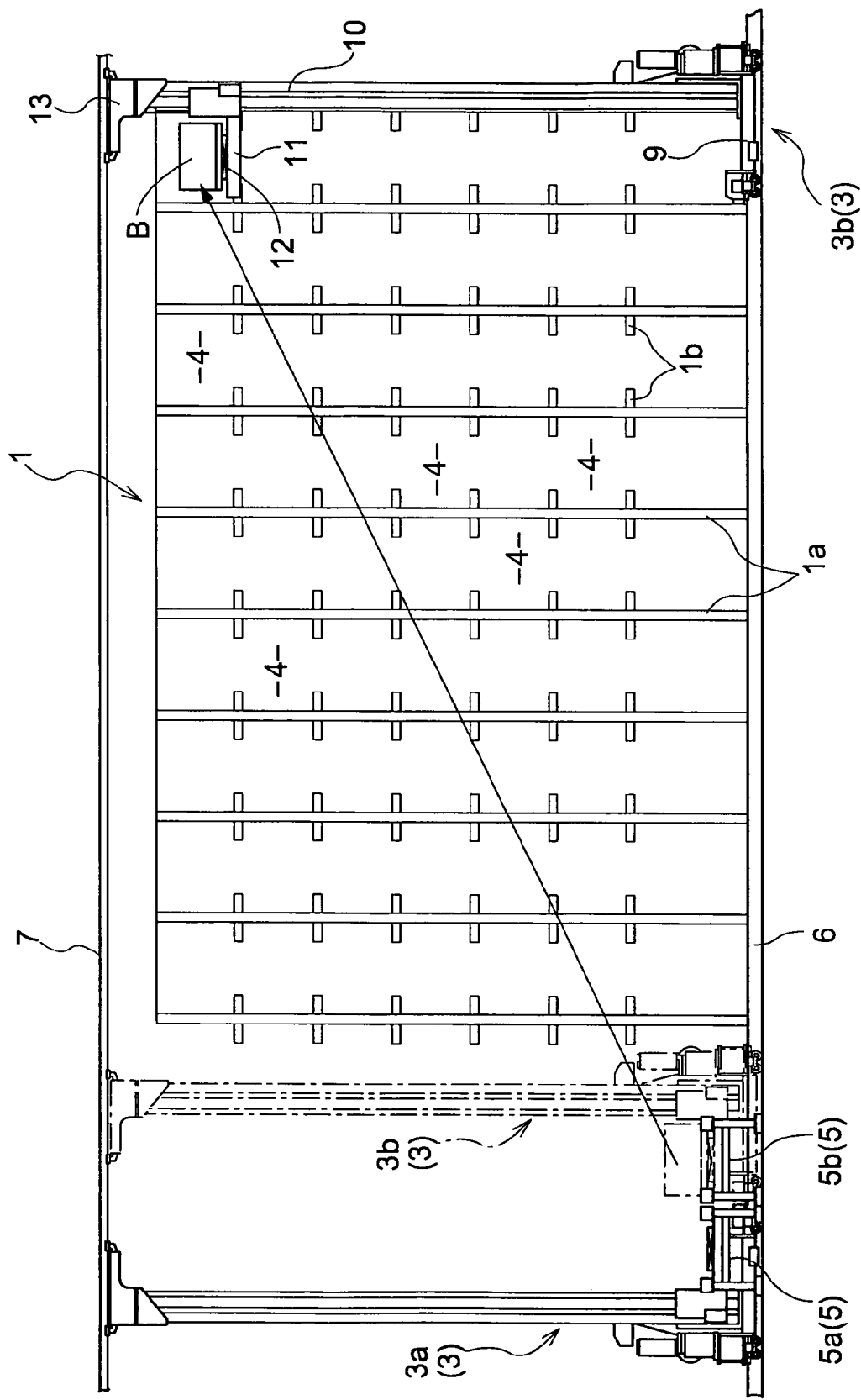
FIG. 6 is a view showing an operation in a second individual storing operation in the first embodiment.

Next, the second individual storing operation will be described with reference to FIG. 6. In the second individual storing operation, of the two stacker cranes 3, the second stacker crane 3*b* located adjacent the article storage rack 1 performs article transport for storing an article B. The second individual storing operation is different from the first individual storing operation only in the stacker crane 3 used in transporting the article B. Thus, the operation of the second stacker crane 3*b* will not be described.

The ground controller 8 controls operation of the first stacker crane 3*a* to retreat out of interference with the article transport by the second stacker crane 3*b*. The article transfer device 12 of the first stacker crane 3a is thereby kept on standby in the storage- and delivery-side article transfer position, Next, the simultaneous delivering operation will be described with reference to FIG. 7. In the simultaneous delivering operation, the two stacker cranes 3, i.e. the first stacker crane 3a and second stacker crane 3b, simultaneously perform article transport for delivering articles B.

The ground controller 8 performs the running control, lifting control and transfer control for each of the first stacker crane 3a and second stacker crane 3b. First, as shown in solid lines in FIG. 7, the two article transfer devices 12 of the first stacker crane 3a and second stacker crane 3b are placed in the rack-side article transfer positions corresponding to storage units 4 from which to fetch the articles B. The article transfer devices 12 fetch the articles B from the storage units 4.

Figure 7:
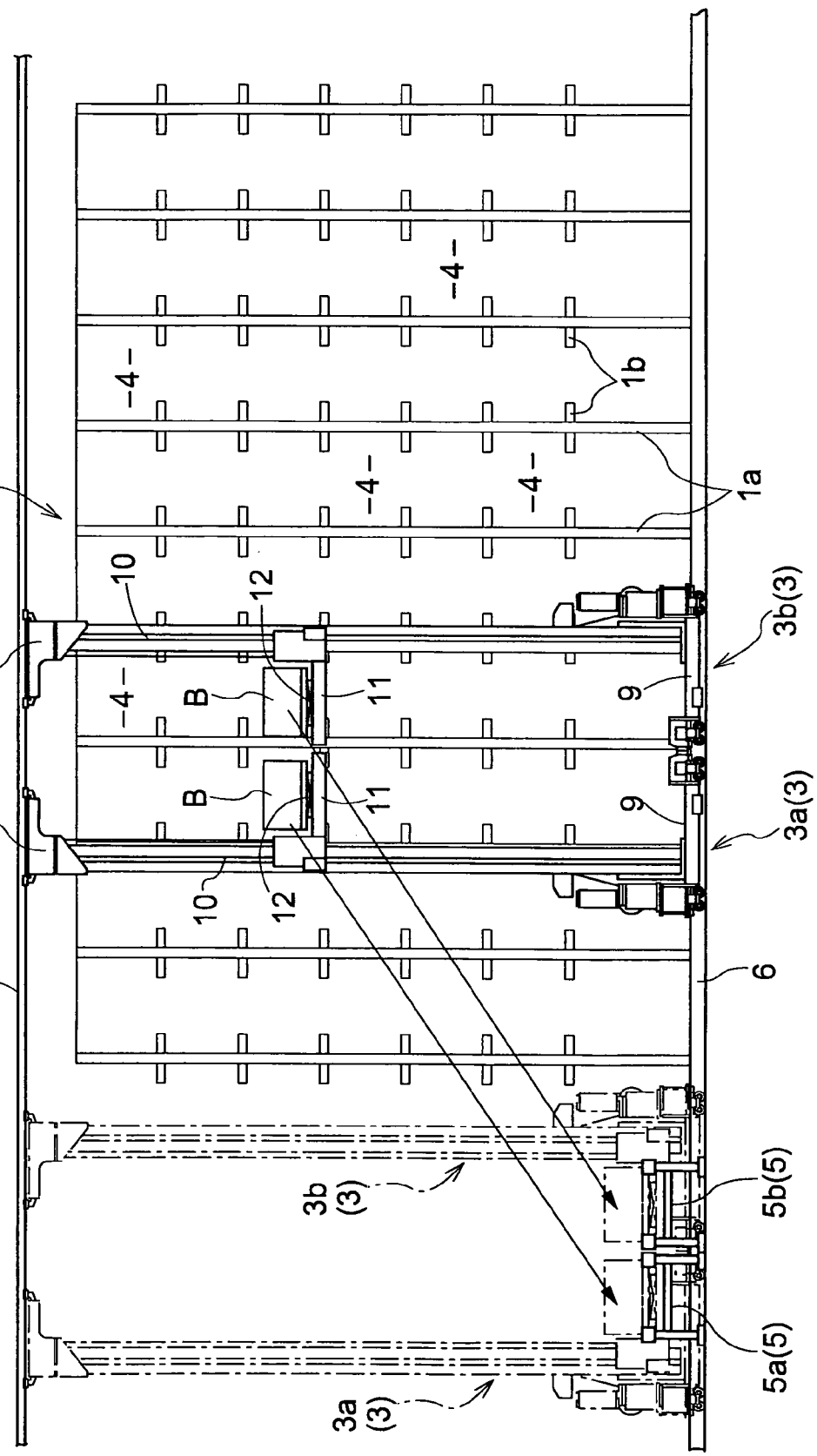
FIG. 7 is a view showing an operation of a simultaneous delivering operation in the first embodiment.

Next, the ground controller 8 performs the running control, lifting control and transfer control for each of the first stacker crane 3a and second stacker crane 3b for moving the two article transfer devices 12 of the first stacker crane 3a and second stacker crane 3b to storage- and delivery-side article transfer positions corresponding to the load support tables 5 for storage and delivery, as shown in dotted lines in FIG. 7. The fetched articles B are transferred to the load support tables 5.

Next, the first individual delivering operation will be described with reference to FIG. 8. In the first individual delivering operation, the first stacker crane 3a performs article transport for delivering an article B.

The ground controller 8 performs the running control, lifting control and transfer control for the first stacker crane 3a. First, as shown in solid lines in FIG. 8, the article transfer device 12 of the first stacker crane 3a is placed in the rack-side article transfer position corresponding to a storage unit 4 from which to fetch the article B. The article transfer device 12 fetches the article B from the storage unit 4.

Figure 8:
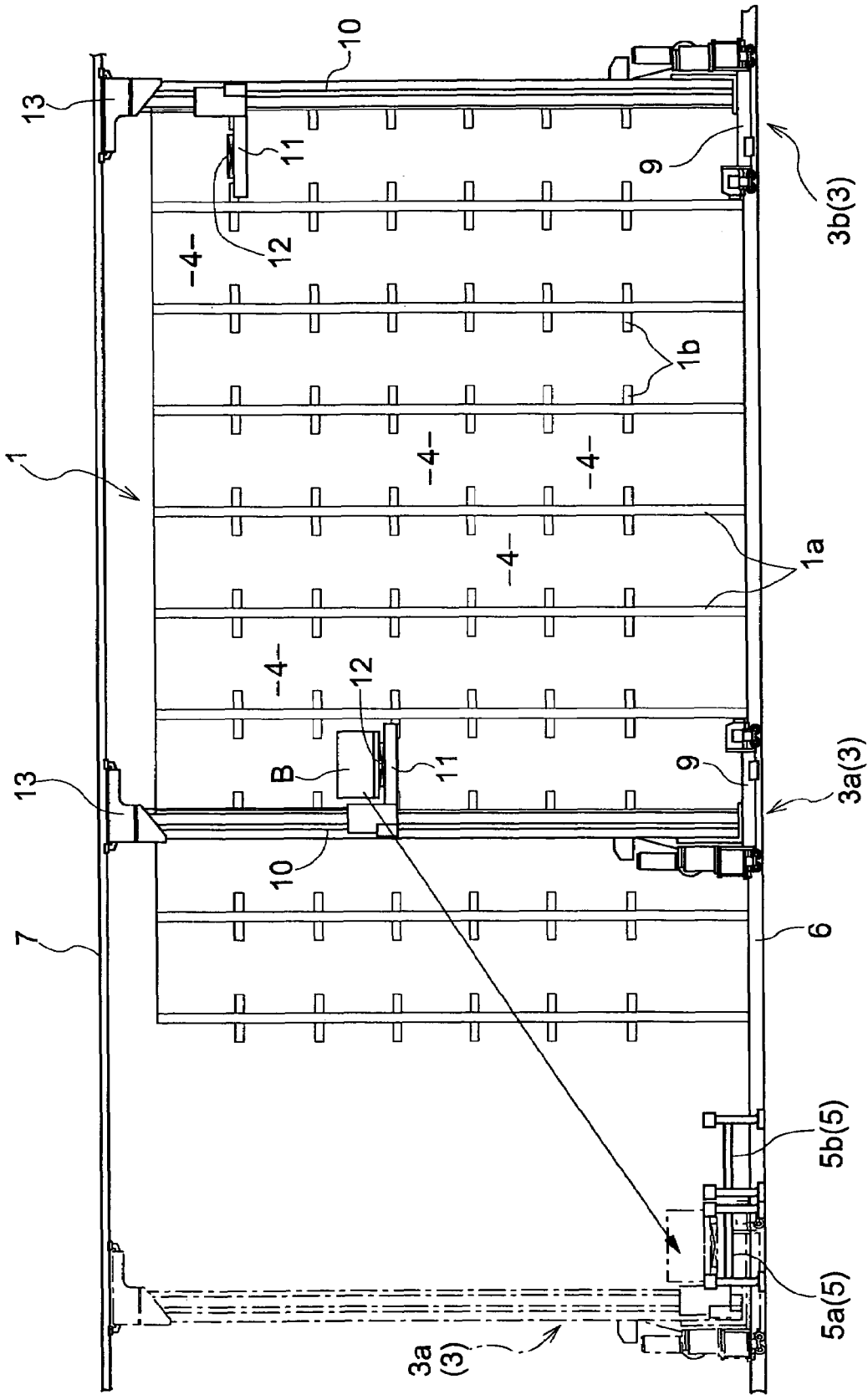
FIG. 8 is a view showing an operation of a first individual delivering operation in the first embodiment.

Next, the ground controller 8 performs the running control, lifting control and transfer control for the first stacker crane 3a for moving the article transfer device 12 of the first stacker crane 3a to the storage- and delivery-side article transfer position corresponding to the load support table 5 for storage and delivery, as shown in dotted lines in FIG. 8. The fetched article B is transferred to the load support table 5.

Figure 9:
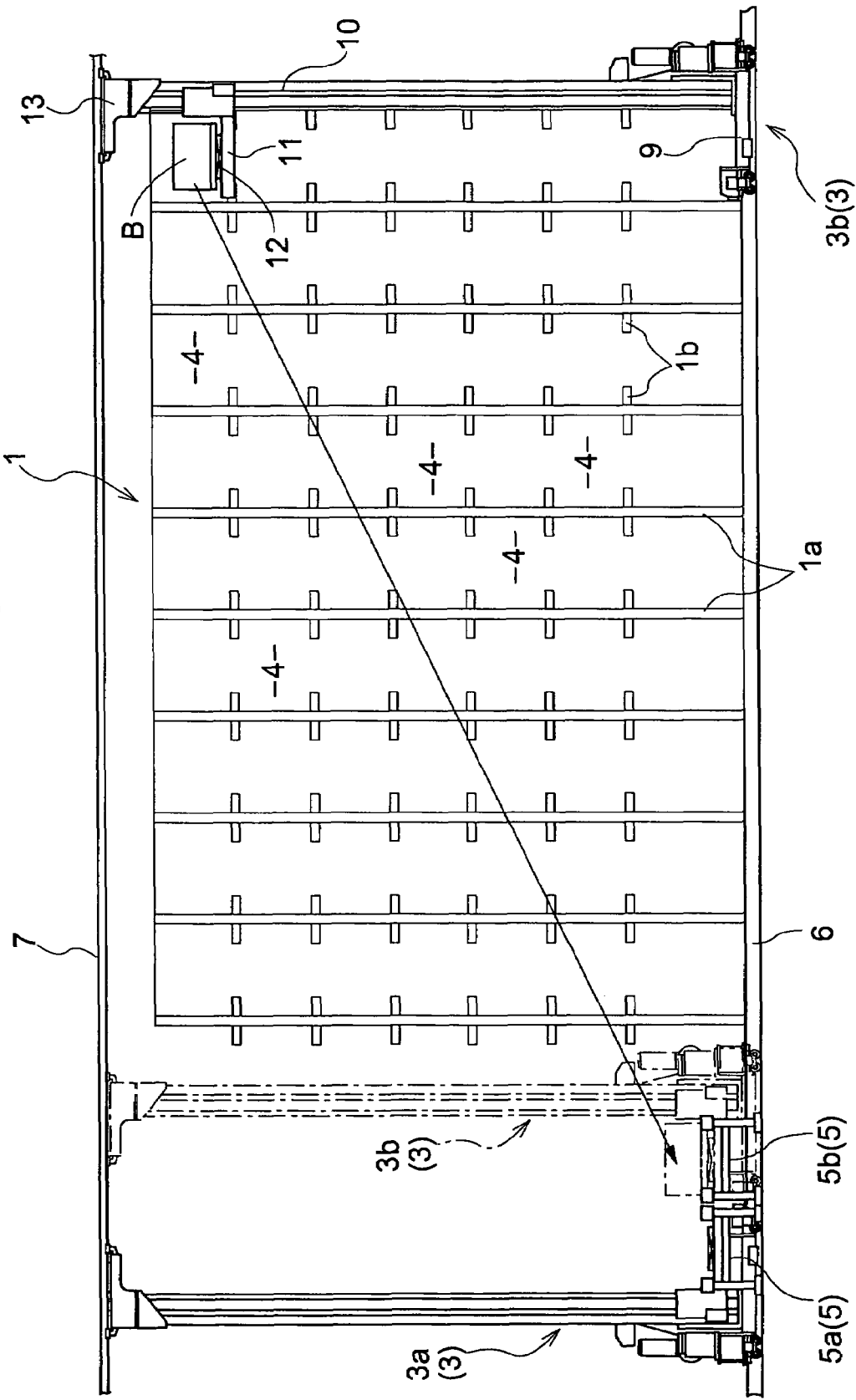
FIG. 9 is a view showing an operation of a second individual delivering operation in the first embodiment.

Next, the second individual delivering operation will be described with reference to FIG. 9. In the second individual delivering operation, the second stacker crane 3b performs article transport for storing an article B. The second individual delivering operation is different from the first individual delivering operation only in the stacker crane 3 used in transporting the article B. Thus, the operation of the second stacker crane 3b will not be described.

The ground controller 8 controls operation of the first stacker crane 3a to retreat out of interference with the article transport by the second stacker crane 3b. The article transfer device 12 of the first stacker crane 3a is thereby kept on standby in the storage- and delivery-side article transfer position.

Figure 10:
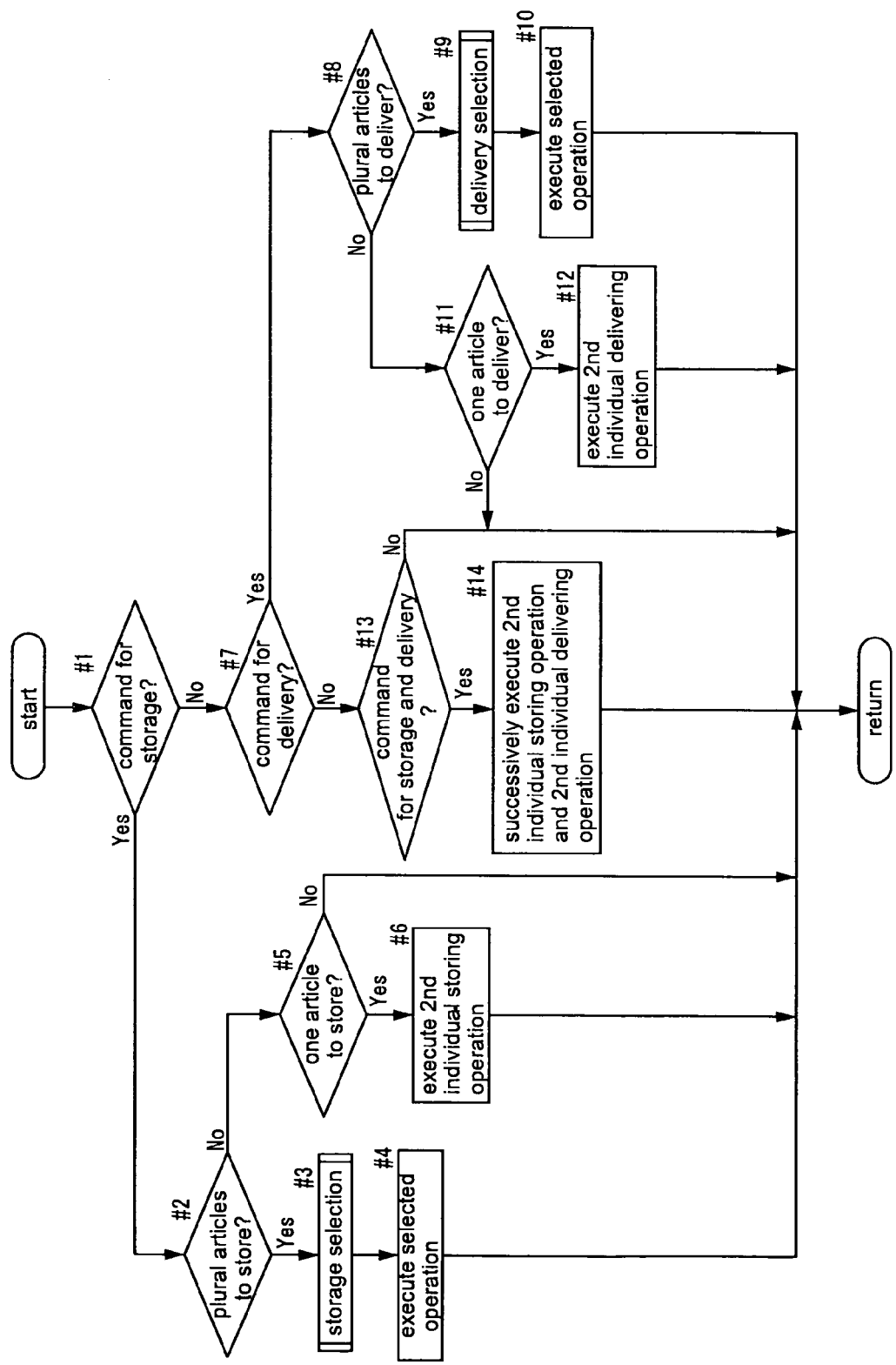
FIG. 10 is a flow chart showing a control operation of a ground controller in the first embodiment.

Operation of the ground controller 8 will be described with reference to the flow chart of FIG. 10.

When instructed to store a plurality of articles B in different storage units 4, the ground controller 8 performs a storage selection operation for selecting whether to execute the simultaneous storing operation or to execute the first individual storing operation successively, and executes the operation selected in the storage selection operation (steps 1-4).

When instructed to store one article B in one storage unit 4, the ground controller 8 executes the second individual storing operation (steps 5 and 6).

When instructed to deliver a plurality of articles B from different storage units 4, the ground controller 8 performs a delivery selection operation for selecting whether to execute the simultaneous delivering operation or to execute the first individual delivering operation successively, and executes the operation selected in the delivery selection operation (steps 7-10). When instructed to deliver one article B from one storage unit 4, the ground controller 8 executes the second individual delivering operation (steps 11 and 12).

When instructed to store one article B in one storage unit 4 and to deliver one article B from one storage unit 4, the ground controller 8 executes the second individual storing operation and the second individual delivering operation (steps 13 and 14).

The storage selection operation will be described.

Selecting conditions for selecting either the execution of the simultaneous storing operation or the successive execution of the first individual storing operation are provided by current positions of the two stacker cranes 3 in the direction of horizontal movement of the stacker cranes 3. The selecting conditions are such that the simultaneous storing operation is selected when, for example, the first stacker crane 3a and second stacker crane 3b are located at the load support tables 5 for storage and delivery, and the first individual storing operation is successively executed when the first stacker crane 3a is located at the load support table 5 and the second stacker crane 3b is located in the deep side range of the article storage racks 2 away from the load support tables 5.

Based on current positions of the two stacker cranes 3 in the direction of horizontal movement of the stacker cranes 3 and the selecting conditions, the ground controller 8 selects either the execution of the simultaneous storing operation or the successive execution of the first individual storing operation, and executes the selected operation.

The delivery selection operation will be described.

As in the storage selection operation, selecting conditions for selecting either the execution of the simultaneous delivering operation or the successive execution of the first individual delivering operation are provided by current positions of the two stacker cranes 3 in the direction of horizontal movement of the stacker cranes 3.

Based on current positions of the two stacker cranes 3 in the direction of horizontal movement of the stacker cranes 3 and the selecting conditions, the ground controller 8 selects either the execution of the simultaneous delivering operation or the successive execution of the first individual delivering operation, and executes the selected operation.

The ground controller 8 performs the running control in time of article transport for storage and delivery as described above. When horizontally moving the two stacker cranes 3 in the running control, a joint moving operation can be executed for controlling operation of the two stacker cranes 3 such that the rear stacker crane 3 pushes the front stacker crane 3 forward.

In the joint moving operation, the ground controller 8 controls operation of the two stacker cranes 3 to cause or set the driving torque of the propelling wheel 20a of the rear stacker crane 3 to be greater than that of the propelling wheel 20a of the front stacker crane 3.

The joint moving operation will be described.

Figure 11:
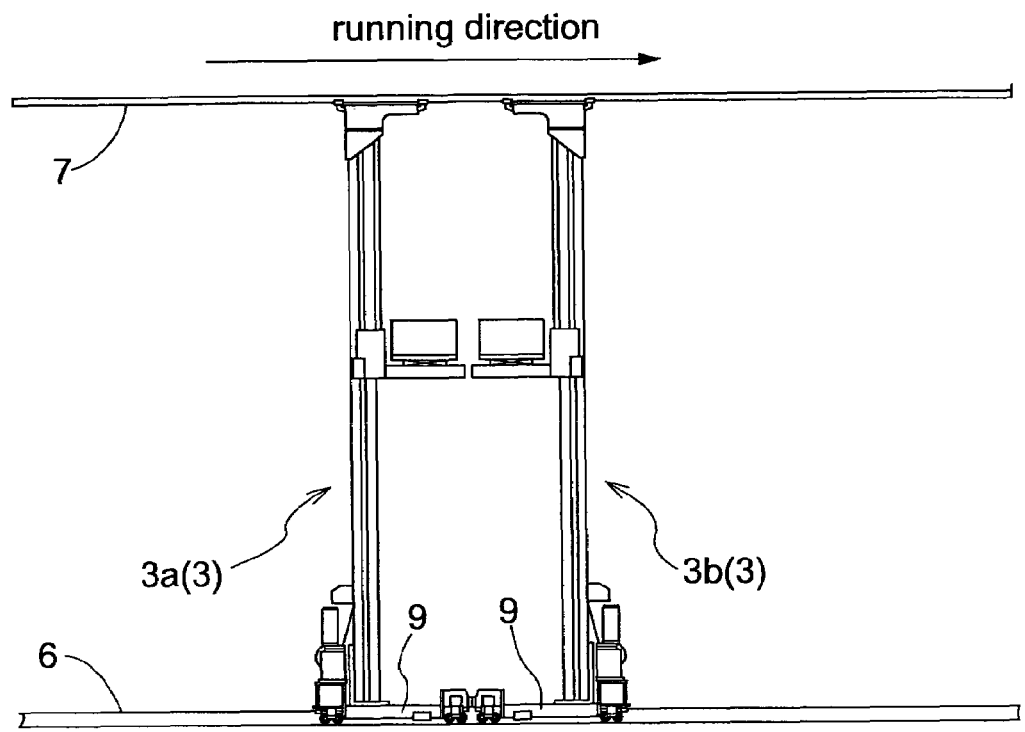
FIG. 11 is a view showing an operation in a joint moving operation in the first embodiment.

The ground controller 8 controls running of the carriages 9 of the two stacker cranes 3 such that, as shown in FIG. 11, the carriage 9 of the stacker crane 3 located at the rear in the running direction (e.g. the first stacker crane 3a) pushes and moves the carriage 9 of the stacker crane 3 located at the front in the running direction (e.g. the second stacker crane 3b).

At this time, the ground controller 8 transmits driving torque command information specifying a target driving torque for the propelling wheel 20a to the running inverter 24 of each of the two stacker cranes 3. Specifically, the ground controller 8 transmits driving torque command information to the running inverter 24 of each of the two stacker cranes 3 for increasing the target driving torque of the propelling wheel 20a of the rear stacker crane 3 to be greater than that of the propelling wheel 20a of the front stacker crane 3.

Based on the driving torque command information, the running inverter 24 adjusts a current value supplied to the running electric motor 21 so that the driving torque of the propelling wheel 20a may become the target driving torque specified in the driving torque command information. The adjustment of a current value for bringing the driving torque of the propelling wheel 20a to the target driving torque may use a feed forward control to apply a current to the running electric motor 21 beforehand so that the driving torque of the propelling wheel 20a may become the target driving torque, a feedback control to detect the driving torque of the propelling wheel 20a and to adjust the current applied to the running electric motor 21 so that the detected driving torque of the propelling wheel 20a may become the target driving torque, or both of the feed forward control and feedback control.

When horizontally moving the two stacker cranes 3 in the running control, the ground controller 8 can execute, besides the joint moving operation, a separate moving operation for controlling operation of the two stacker cranes 3 such that the two separate stacker cranes 3 are moved for article transport independently of each other.

The separate moving operation will be described.

Figure 12:
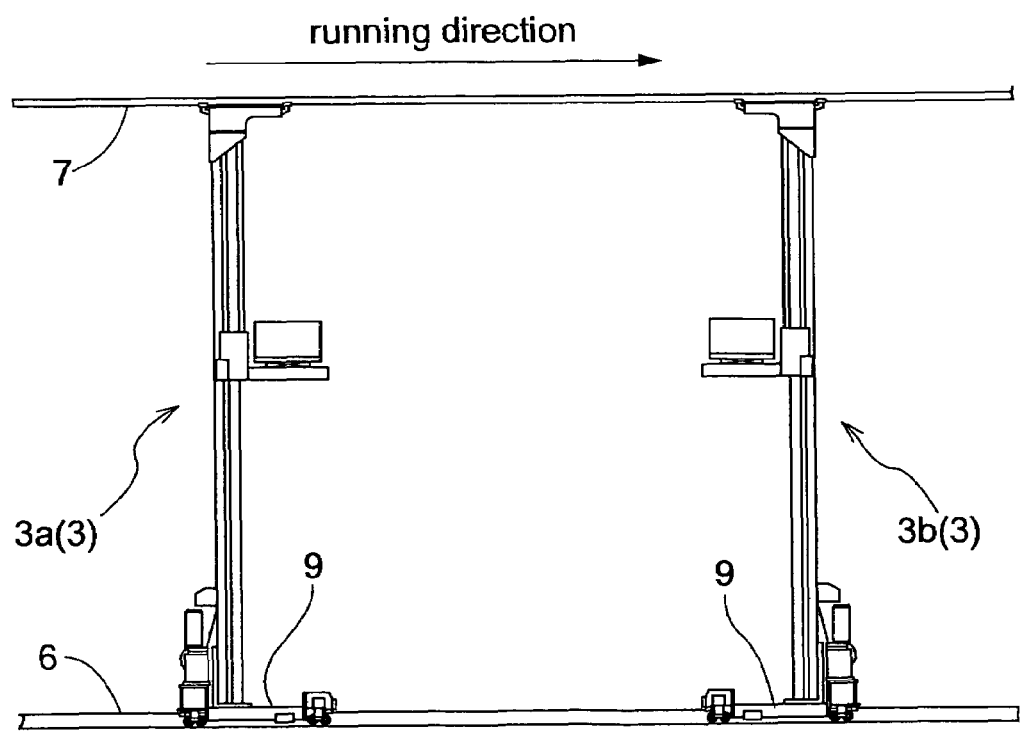
FIG. 12 is a view showing an operation of a separate moving operation in the first embodiment.

The ground controller 8 controls running of the carriages 9 of the two stacker cranes 3 separately such that, as shown in FIG. 12, the carriage 9 of the stacker crane 3 located at the rear in the running direction (e.g. the first stacker crane 3a) and the carriage 9 of the stacker crane 3 located at the front in the running direction (e.g. the second stacker crane 3b) are moved horizontally as separated from each other.

At this time, as described in the running control, the ground controller 8 transmits running speed command information as driving torque command information to the running inverter 24 of each of the two stacker cranes 3. The ground controller 8 transmits also stop command information to the running inverter 24 of each of the two stacker cranes 3 for stopping the carriage 8 when the distance between the two stacker cranes 3 becomes less than a predetermined distance.

When horizontally moving only one of the two stacker cranes 3, the ground controller 8 performs the running control of only that stacker crane 3. As described in the running control above, the ground controller 8 transmits running speed command information as the running command information to the running inverter 24 of the stacker crane 3 to run the stacker crane 3.

The ground controller 8 can select between the joint moving operation and separate moving operation. Thus, the ground controller 8 is constructed to execute either the joint moving operation or separate moving operation based on the running positions and running directions of the carriages 9 of the two stacker cranes 3.

That is, the ground controller 8 selects the joint moving operation when the running directions of the two carriages 9 are the same, and the stacker cranes 3 are in an adjacent state horizontally close to each other with the distance between the two carriages 9 less than a proximity distance. The ground controller 8 selects the separate moving operation when the running directions of the two carriages 9 are different, or when the stacker cranes 3 are located horizontally remote from each other with the distance between the two carriages 9 more than the proximity distance even if the running directions of the two carriages 9 are the same.

The adjacent state will be described.

For example, when performing the simultaneous storing operation, as shown in the dotted lines in FIG. 4, the two article transfer devices 12 of the first stacker crane 3a and second stacker crane 3b are placed in the storage- and delivery-side article transfer positions. At this time, the two stacker cranes 3 are in the adjacent state located horizontally close to each other, and thus the ground controller 8 selects and executes the joint moving operation.

When performing the simultaneous delivering operation for fetching articles B from storage units 4 adjacent to each other in the direction of rack width, as shown in the solid lines in FIG. 7, the two article transfer devices 12 of the first stacker crane 3a and second stacker crane 3b are placed in the rack-side article transfer positions corresponding to the storage units 4 adjacent to each other in the direction of rack width, from which to fetch the articles B. At this time, the two stacker cranes 3 are in the adjacent state located horizontally close to each other, and thus the ground controller 8 selects and executes the joint moving operation.

At another time than when performing the above simultaneous storing operation and simultaneous delivering operation, for example, when the two stacker cranes 3 stand still in positions horizontally close to each other, in order to move one stacker crane 3 horizontally to an intended transfer position, the other stacker crane 3 also is moved horizontally. When the two stacker cranes 3 standing still in positions horizontally close to each other are moved in the same horizontal direction as noted above, the two stacker cranes 3 are in the adjacent state, and thus the ground controller 8 selects and executes the joint moving operation.

Figure 13:
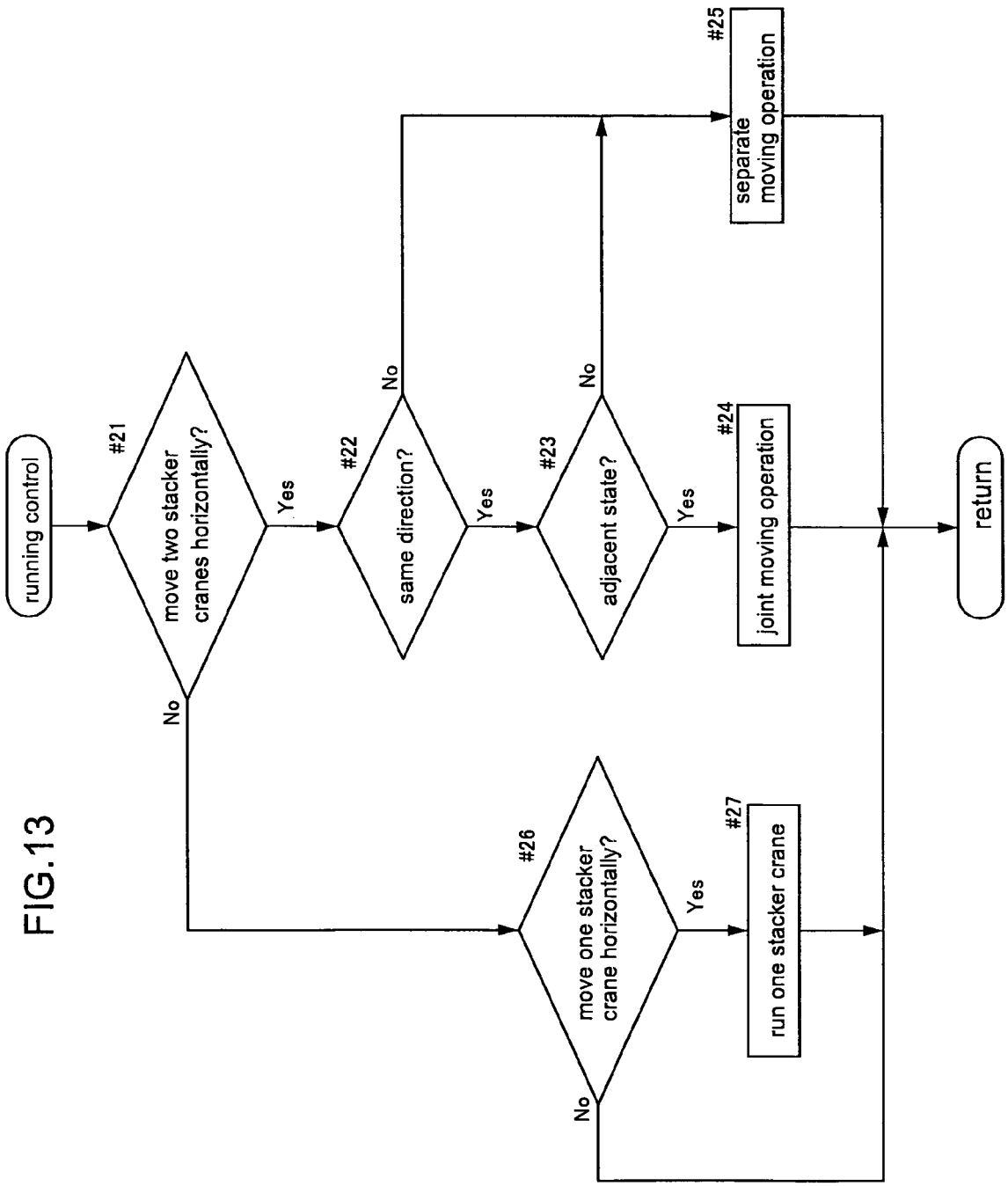
FIG. 13 is a flow chart showing a control operation of the ground controller in the first embodiment.

The selection between the joint moving operation and separate moving operation in the running control by the ground controller 8 will be described with reference to the flow chart of FIG. 13.

The ground controller 8 executes the joint moving operation when horizontally moving the two stacker cranes 3, the running directions of the two carriages 9 are the same, and the two stacker cranes 3 are in the adjacent state (steps 21-24).

The ground controller 8 executes the separate moving operation when horizontally moving the two stacker cranes 3 and the running directions of the two carriages 9 are different, or when the stacker cranes 3 are not in the adjacent state even if the running directions of the two carriages 9 are the same (step 25).

When running only one of the two stacker cranes 3, the ground controller 8 performs the running control only for that stacker crane 3 (steps 26 and 27).

Next, a second embodiment of this invention will be described with reference to FIG. 16 et seq. This embodiment relates to coping with an abnormality occurring with one of the mobile bodies. While a plurality of embodiments are described herein, a combination of the characteristic features of one embodiment different from the characteristic features of the other embodiments is also included in the scope of this invention in the absence of a conflict. In the following description, like reference numbers will be affixed to like components which are the same as in the foregoing embodiment, and will not be described again.

Figure 16:
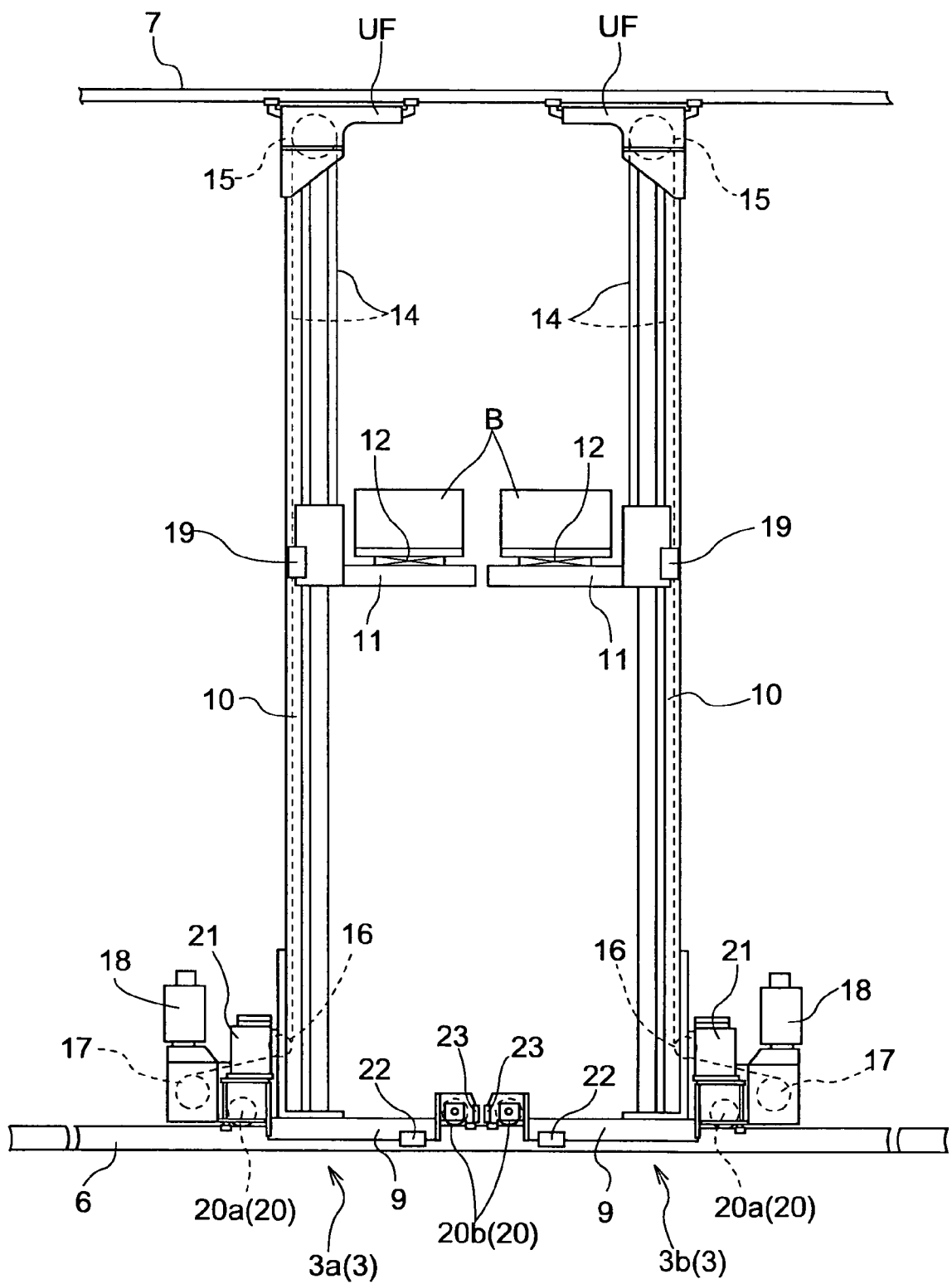
FIG. 16 is a side elevation of stacker cranes in a second embodiment.

In the second embodiment, as shown in FIG. 16, the lifting electric motor 18 and drum 17 are supported in a position farther away from the vertical mast 10 than the running electric motor 21. In this embodiment, each stacker crane has a control device as described in detail hereinafter. In this embodiment, a chain 14 is used instead of the wire 14, and a guide sprocket 15 instead of the guide pulley 15.

Each of the plurality of storage units 4 of the article storage racks 1 and each of the load support tables (article supports) 5 for storage and delivery provide an article transfer location K.

Figure 17:
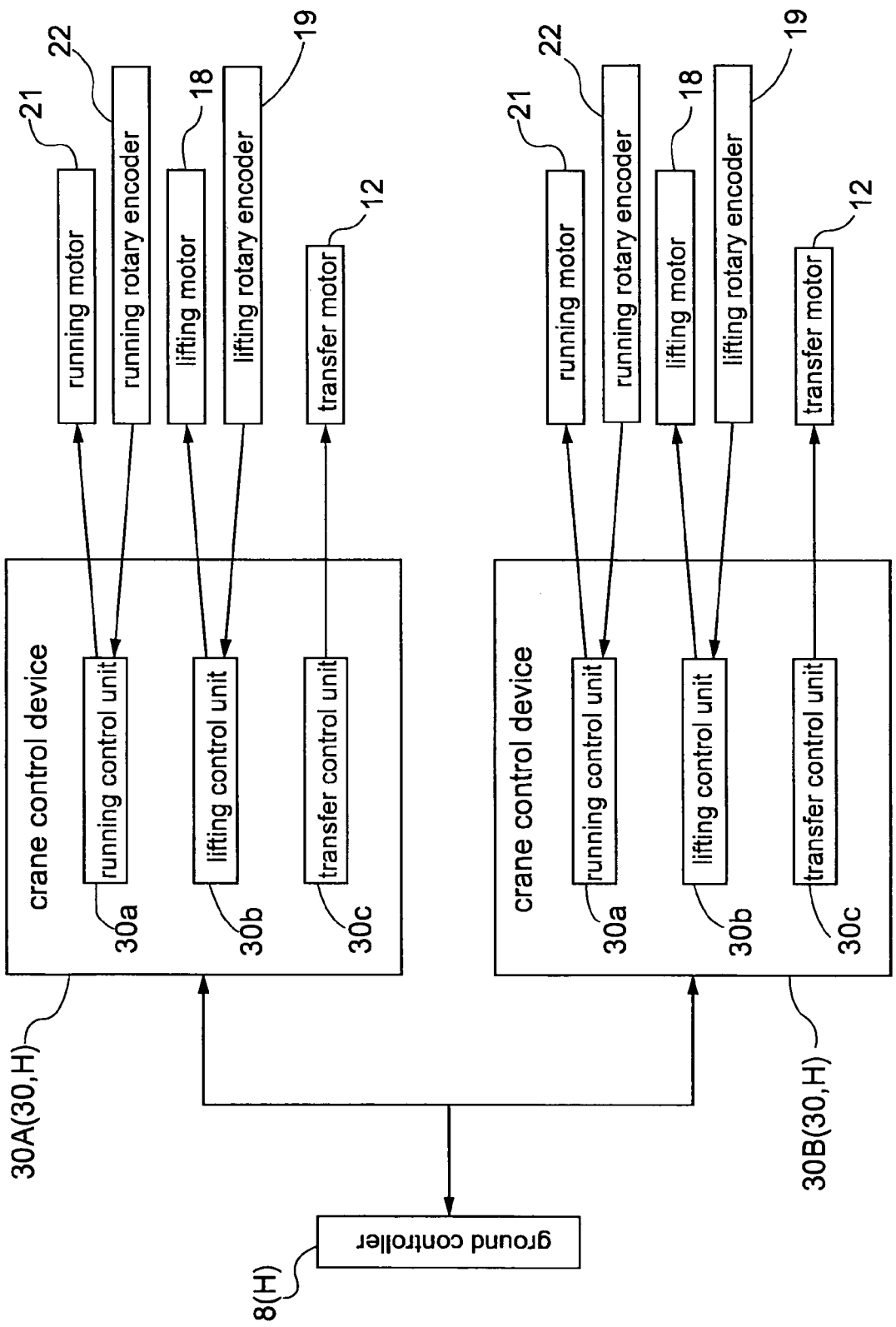
FIG. 17 is a control block diagram of the article storage facility in the second embodiment.

Specifically, as shown in FIG. 17, each of the two stacker cranes 3 has a crane control device 30 for controlling operation of the stacker crane 3. In FIG. 17, the crane control device 30 of the first stacker crane 3a is shown as the first crane control device 30A, and the crane control device 30 of the second stacker crane 3b as the second crane control device 30B.

Each crane control device 30 receives detection information from the lifting rotary encoder 19 and detection information from the running rotary encoder 22. The first crane control device 30A and second crane control device 30B have the same construction. Each crane control device 30 controls the horizontal movement of the carriage 9 and the lifting operation of the lift unit 11 to move the transfer device 12 to a rack-side article transfer position corresponding to each of the plurality of storage units 4 and to a storage- and delivery-side article transfer position corresponding to each of the load support tables 5. Each crane control device 30 controls also the transfer operation of the article transfer device 12 to transfer articles to or from each storage unit 4 and each load support table 5 in the rack-side article transfer position and storage- and delivery-side article transfer position.

Each crane control device 30 includes a running control unit 30a for performing running control to control the horizontal movement of the carriage 9, based on the detection information from the running rotary encoder 22, in order to stop the carriage 9 at an instructed target running stop position, a lifting control unit 30b for performing lifting control to control the lifting operation of the lift unit 11, based on the detection information from the lifting rotary encoder 19, in order to stop the lift unit 11 at an instructed target lifting stop position, and a transfer control unit 30c for performing transfer control to control the transfer operation of the transfer device 12 to transfer articles to and from the storage units 14 and load support tables 5.

In the running control by the running control unit 30a, the running electric motor 21 is operated to start horizontal movement of the carriage 9. When the running position of the carriage 9 detected by the running rotary encoder 22 reaches an instructed target running stop position, the operation of the running electric motor 21 is stopped and brakes are applied to stop the carriage 9 at the target running stop position.

In the lifting control by the lifting control unit 30b, the lifting electric motor 18 is operated to start vertical movement of the lift unit 11. When the lifting position of the lift unit 11 detected by the lifting rotary encoder 19 reaches an instructed lifting target stop position, the operation of the lifting electric motor 18 is stopped and brakes are applied to stop the lift unit 11 at the target lifting stop position.

In the transfer control by the transfer control unit 30c, the fork-type transfer device 12 is operated to project the fork and scoop up an article B or deposit an article B, and thereafter retract the fork.

Various information can be communicated between each crane control device 30 and ground controller 8. The ground controller 8 transmits various commands to the two crane control devices 30 of the first crane control device 30A and second crane control device 30B.

Each crane control device 30, based on the commands from the ground controller 8, performs the running control by the running control unit 30a, the lifting control by the lifting control unit 30b, and the transfer control by the transfer control unit 30c.

Thus, the control device H is made up of the ground controller 8 and two crane control devices 30 for controlling the operation of the plurality of stacker cranes 3.

The control device H performs the storing operation when instructed to store an article B, and the delivering operation when instructed to deliver an article B.

In the storing operation, the ground controller 8 transmits a storing command to the crane control device 30. The storing command specifies target lifting stop positions and target running stop positions for a storage- and delivery-side article transfer position corresponding to a load support table 5 from which to receive an article B, and a rack-side article transfer position corresponding to a storage unit 4 in which to store the article B.

The crane control device 30 performs the running control by the running control unit 30a, the lifting control by the lifting control unit 30b, and transfer control by the transfer control unit 30c, first to receives the article B from the load support table 5 supporting the article B, and next to store the received article B in the storage unit 4 which should store the article B.

In the running control by the running control unit 30a at this time, the operation of the running electric motor 21 is controlled to move horizontally the carriage 9 at a transport speed. The transport speed is a speed set for performing article transport, which is the highest possible speed for improved transport performance.

In the delivering operation, the ground controller 8 transmits a delivering command to the crane control device 30. The delivering command specifies target lifting stop positions and target running stop positions for a rack-side article transfer position corresponding to a storage unit 4 from which to fetch an article B and a storage- and delivery-side article transfer position corresponding to a load support table 5 to which to transfer the fetched article B.

The crane control device 30 performs the running control by the running control unit 30a, the lifting control by the lifting control unit 30b, and transfer control by the transfer control unit 30c, first to fetch the article B from the storage unit 4 storing the article B, and next to transfer the fetched article B to the load support table 5 which should receive the article B.

In the running control by the running control unit 30a at this time, the operation of the running electric motor 21 is controlled to move horizontally the carriage 9 at the transport speed as in the storing operation.

The crane control device 30 can transmit to the ground controller 8 abnormality information indicating that the associated stacker crane 3 is in an abnormal condition. The ground controller 8 determines whether the two stacker cranes 3 are in an abnormal condition from whether abnormality information is received from the two crane control devices 30.

The abnormal condition may be an abnormality of the transfer device 12, an abnormality of the lifting electric motor 18, or an abnormality of the running electric motor 21, for example, which makes the stacker crane 3 incapable of continued operation. Methods of detecting an abnormality is well known, and any one of these methods may be applied to this invention. For example, in order to detect a displacement of a displaceable component such as the transfer device 12, a comparison may be made between a displacement signal relating to this component and an actual position of the component after passage of a predetermined time. The actual position can be measured by a known technique using a rotary encoder associated with the component or a range finder such as a laser range finder. It is also possible to detect an abnormality of a motor by using a rotation sensor or a position sensor. Further, an abnormality may be detected by monitoring electric power supplied to a component such as a drive motor.

When the two stacker cranes 3 are not in an abnormal condition, the control device H can perform a plural moving operation for controlling operation of the two stacker cranes 3.

To describe this further, when no abnormality information is received from either of the two crane control devices 30, the ground controller 8 performs the plural moving operation. In the plural moving operation, it is possible to execute a simultaneous operation for transmitting a storing command or delivering command to the two crane control devices 30 for operating the two stacker cranes 3, and an individual operation for transmitting a storing command or delivering command to one crane control device 30 for operating one of the two stacker cranes 3. Depending on the contents of a command, the ground controller 8 transmits a storing command or delivering command to the two crane control devices 30 to select and execute one of the simultaneous operation and individual operation.

When either of the two stacker cranes 3 is in an abnormal condition, the control device H can execute a retreating operation for controlling operation of the two stacker cranes 3 to cause the stacker crane 3 in normal condition to push and move the stacker crane 3 in the abnormal condition to a retreat area.

When either of the two stacker cranes 3 is in an abnormal condition, the control device H executes the retreating operation automatically rather than executing the retreating operation in response to a certain command given.

That is, the control device H performs the retreating operation upon receipt of abnormality information from either of the two stacker cranes 3.

The retreating operation for handling the first stacker crane 3a in an abnormal condition will be described hereinafter with reference to FIGS. 18 through 20.

Figure 18:
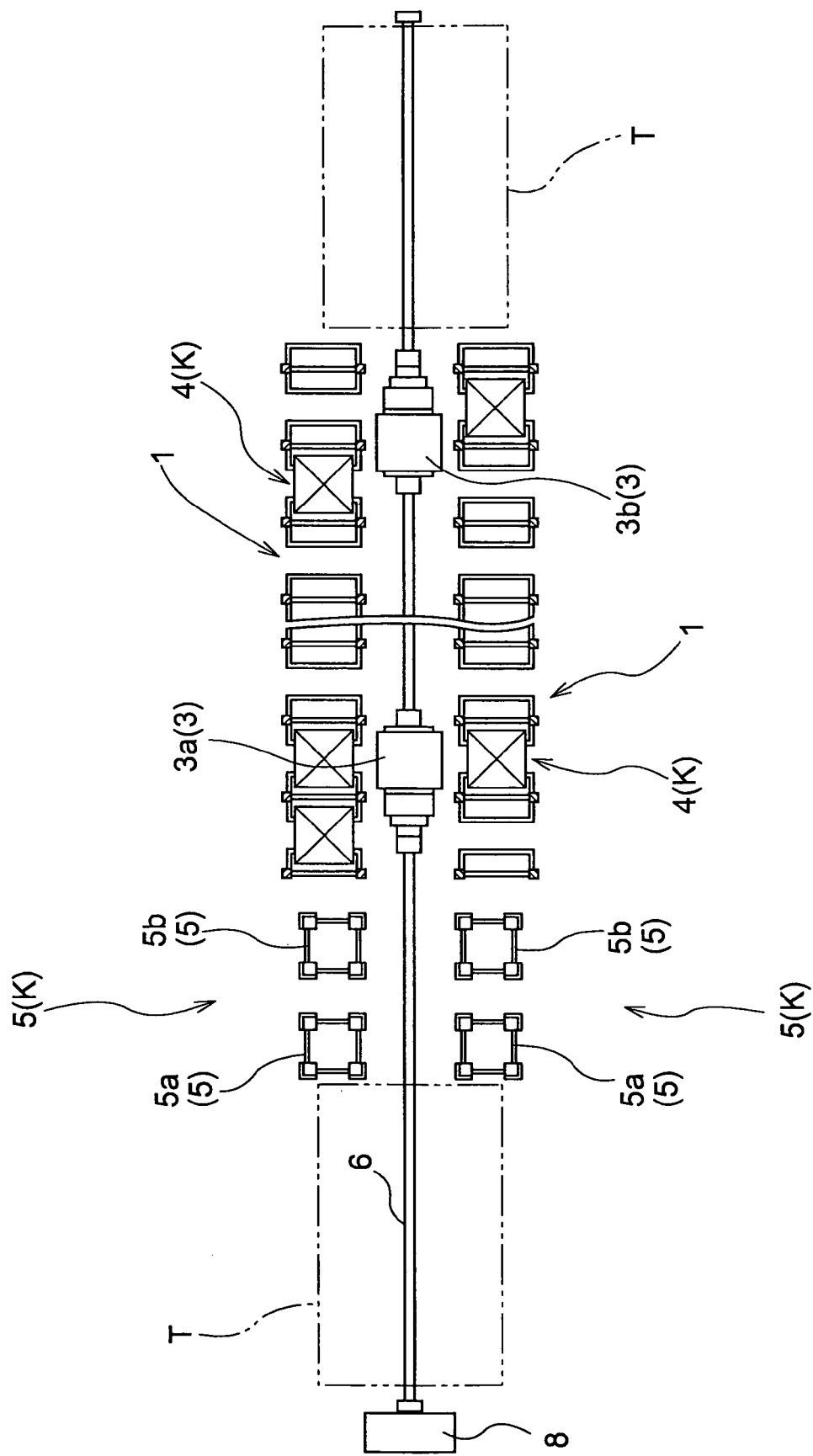
FIG. 18 is a plan view of the article storage facility in the second embodiment.

FIG. 18 is a plan view of the article storage facility. FIGS. 19 and 20 are side elevations of the stacker cranes 3 in the retreating operation.

As shown in FIG. 18, retreat areas T are set to opposite ends of the rail track 6 outside the range of horizontal movement of the stacker cranes 3 in article transport. The retreat area T adjacent the load support tables 5 for storage and delivery is for receiving the first stacker crane 3a, and the retreat area T adjacent the article storage racks 1 is for receiving the second stacker crane 3b.

Thus, the retreat areas T are provided in positions where the stacker crane 3 in an abnormal condition retreated to one of the retreat areas T will not interfere with the article transport of the remaining stacker crane 3. While FIGS. 18 through 20 show the retreat areas T having a space in the horizontal direction for receiving the two stacker cranes 3, the retreat areas T may have a space in the horizontal direction for receiving at least one stacker crane 3.

When the first stacker crane 3a is in an abnormal condition, the first crane control device 30A will bring the first stacker crane 3a to an emergency stop, and transmit abnormality information to the ground controller 8. Then, the ground controller 8 performs the retreating operation for causing the second stacker crane 3b in normal condition to push and move the first stacker crane 3a in the abnormal condition to the retreat area T.

A restoration measure is taken for the stacker crane 3 in the abnormal condition moved to the retreat area T, to remedy the abnormality.

In the retreating operation, the ground controller 8 first commands the first crane control device 30A to release the running brakes to make the first stacker crane 3a movable. Next, the ground controller 8 gives a pushing command to the second crane control device 30B. In response to the pushing command from the ground controller 8, the second crane control device 30B performs a pushing operation for controlling the horizontal movement of the second stacker crane 3b to push and move the first stacker crane 3a to the retreat area T.

When the ground controller 8 gives the pushing command to the second crane control device 30B, it is possible that the second stacker crane 3b is engaged in an article transporting operation. In that case, after waiting for completion of this operation, the ground controller 8 gives the pushing command to the second crane control device 30B.

Upon receipt of the pushing command, the second crane control device 30B causes the lifting control unit 30b to perform the lifting control to place the lift unit 11 in the lowermost position.

When bringing the first stacker crane 3a to an emergency stop, the first crane control device 30A, if possible, causes the lifting control unit 30b to perform the lifting control to place the lift unit 11 in the lowermost position.

Figure 19:
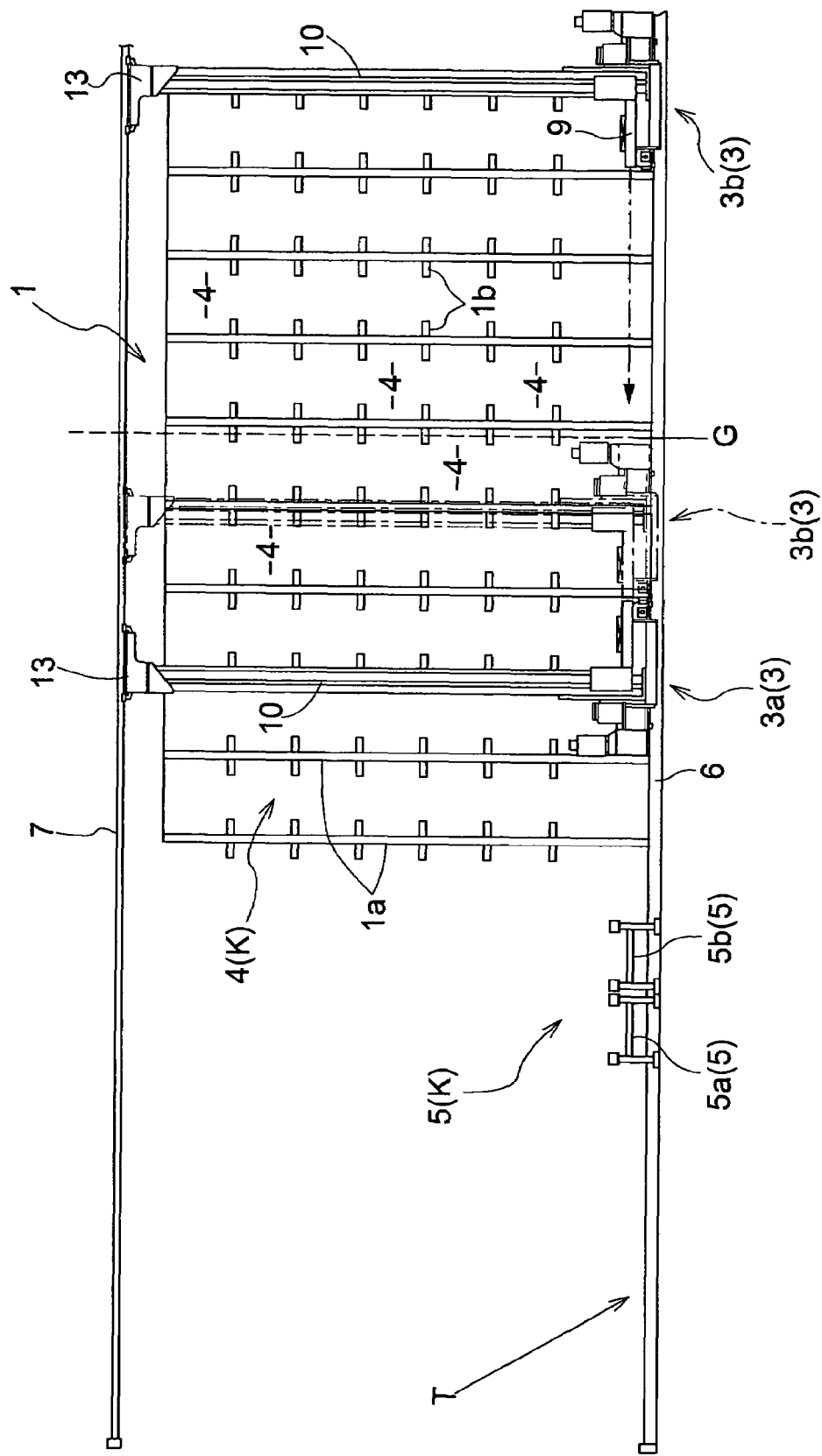
FIG. 19 is a side elevation of the stacker cranes in a retreating operation in the second embodiment.

In the pushing operation, as shown in FIG. 19, the running control unit 30a of the second stacker crane 3b, based on the detection information from the running rotary encoder 22, controls the operation of the running electric motor 21 for causing the carriage 9 to move horizontally at the transport speed until it arrives at a slowdown position G spaced a predetermined distance from the existing position of the first stacker crane 3a toward the second stacker crane 3b.

Subsequently, when the carriage 9 arrives at the slowdown position G, the running control unit 30a of the second stacker crane 3b controls the operation of the running electric motor 21 for causing the carriage 9 to move horizontally at a retreating speed slower than the transport speed. Then, the second stacker crane 3b contacts and starts pushing the first stacker crane 3a as shown in dotted lines in FIG. 19.

Figure 20:
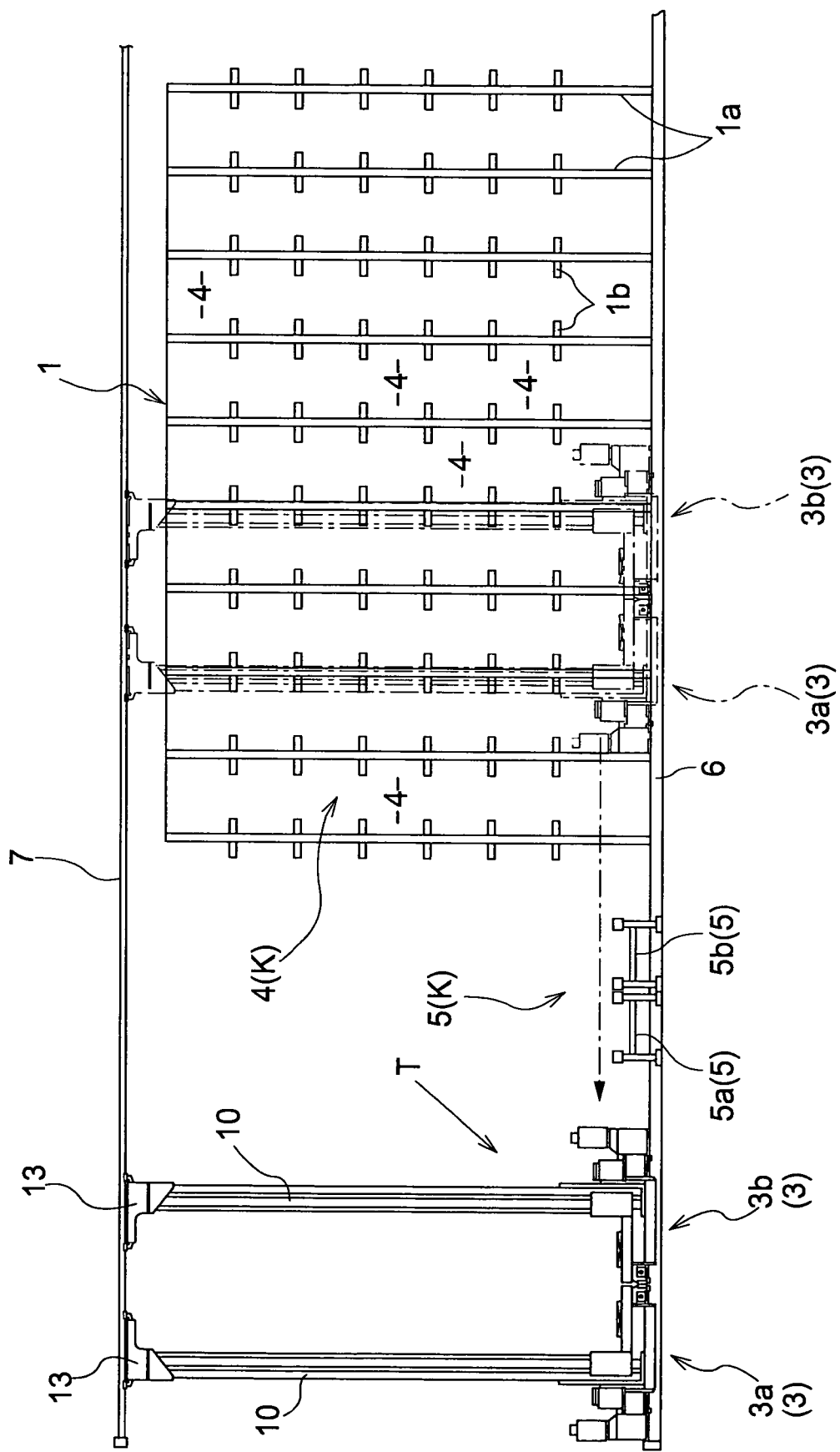
FIG. 20 is a side elevation of the stacker cranes in the retreating operation in the second embodiment.

As shown in FIG. 20, the running control unit 30a of the second stacker crane 3b controls the operation of the running electric motor 21 for causing the carriage 9 to move horizontally at the retreating speed until the first stacker crane 3a reaches the retreat area T.

The second crane control device 30B determines whether the first stacker crane 3a has arrived at the retreat area T, based on the detection information from the running rotary encoder 22.

In this way, in the retreating operation, the control device H controls the operation of the stacker crane 3 in normal condition, for causing the stacker crane 3 in normal condition to move horizontally at the transport speed up to the slowdown position G, and to move horizontally at the retreating speed slower than the transport speed from the slowdown position G until the stacker crane 3 in the abnormal condition moves to the retreat area T.

The retreating speed is set to the slowest possible speed in order to reduce a shock in time of contact between the stacker cranes 3.

When the stacker crane 3 in the abnormal condition has been moved to the retreat area T, the control device H performs a moving operation for the time of abnormality to control the operation of the remaining stacker crane 3.

To describe the case of the first stacker crane 3a being moved to the retreat area T, as shown in FIGS. 18 through 20, when the first stacker crane 3a in the abnormal condition has been moved to the retreat area T by execution of the retreating operation, the second crane control device 30B transmits to the ground controller 8 retreating operation completion information indicating completion of the retreating operation. When the ground controller 8 receives the retreating operation completion information and confirms the end of the retreating operation, the ground controller 8 executes the moving operation for the time of abnormality.

In the moving operation for the time of abnormality, the control device H executes an individual operation for the time of abnormality to transmit a storing command and a delivering command to the second crane control device 30B to operate the second stacker crane 3b of the two stacker cranes 3.

Figure 21:
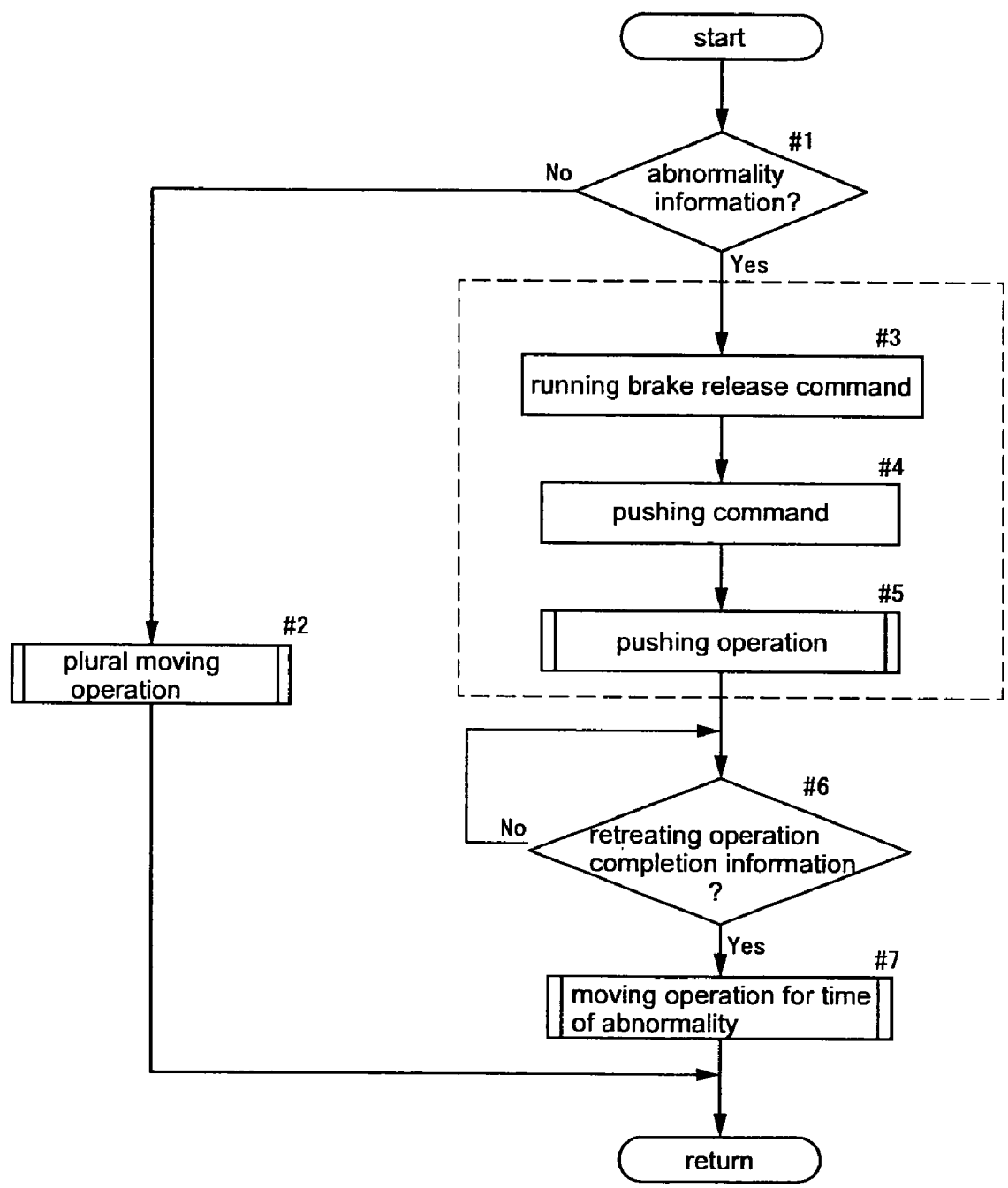
FIG. 21 is a flow chart of a control operation of a control means in the second embodiment.

The operation of the control device H will be described with reference to the flow chart of FIG. 21.

The ground controller 8 performs the plural moving operation in the absence of abnormality information from any one of the two crane control devices 30 (steps 1 and 2).

The ground controller 8 performs the retreating operation when abnormality information is received from one of the two crane control devices 30 (steps 3-5).

In the retreating operation, the ground controller 8 commands the crane control device 30 that transmitted the abnormality information, to release the running brakes, and gives a pushing command to the other crane control device 30 (steps 3 and 4). The crane control device 30 not having transmitted the abnormality information performs the pushing operation (step 5).

Subsequently, upon receipt of the retreating operation completion information, the ground controller 8 performs the moving operation for the time of abnormality (steps 6 and 7).

Thus, when either the first stacker crane 3a or the second stacker crane 3b becomes an abnormal condition, the retreating operation and the moving operation for the time of abnormality are carried out successively and automatically. Even if the operator gives no instruction, the stacker crane 3 in the abnormal condition is moved to the retreat area T, and thereafter article transport may be continued with the one remaining stacker crane 3.

OTHER EMBODIMENTS (1) In the above embodiments, each of the two stacker cranes 3 transports one article B at a time. In addition to the two stacker cranes 3 each transporting one article B, as shown in FIG. 14, the two stacker cranes 3 can also transport in combination one article D having a larger width than articles B.

Figure 15:
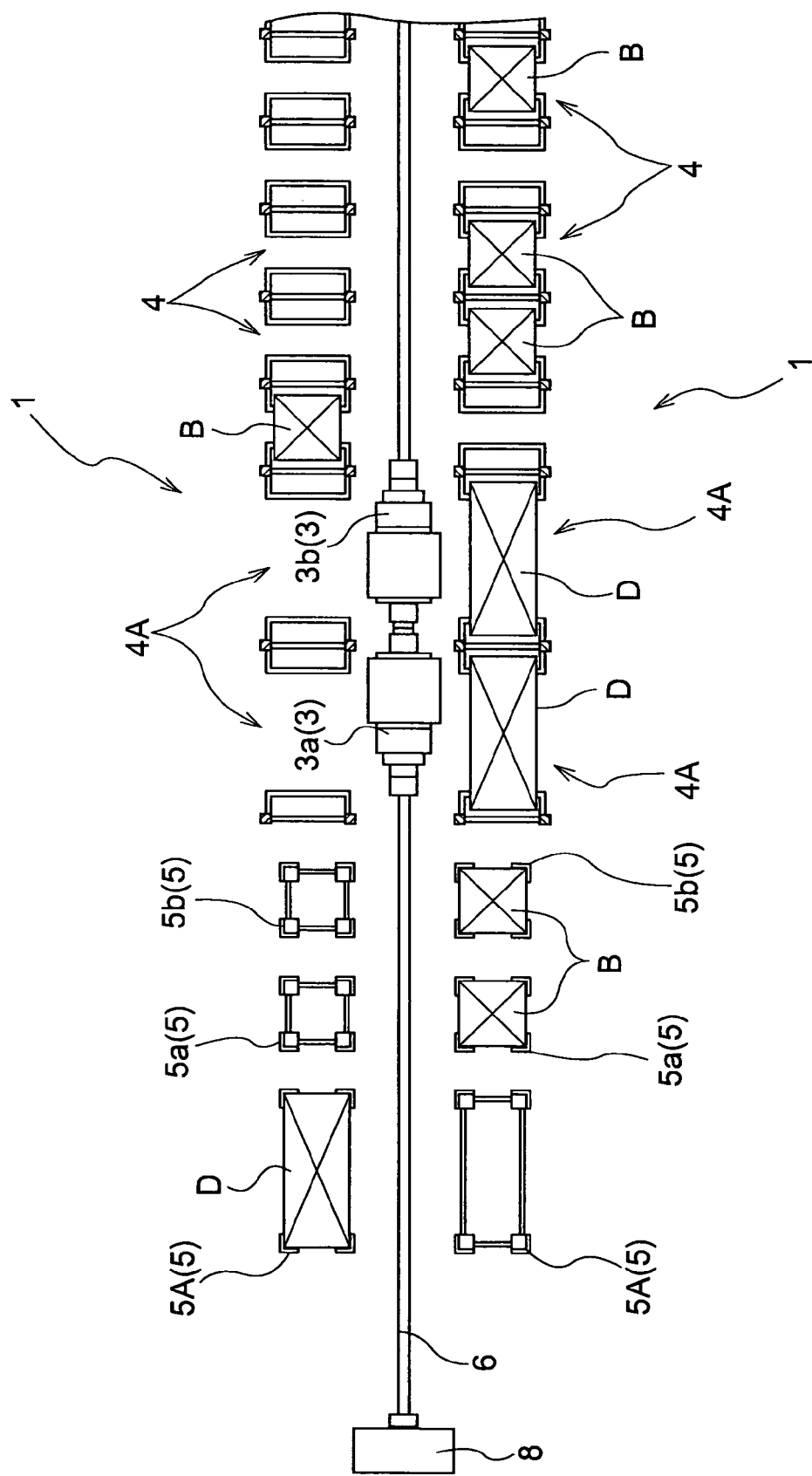
FIG. 15 is a plan view of an article storage facility in the different embodiment.

Specifically, since the articles B and the wide articles D are to be stored in the storage units 4 in the article storage racks 1, as shown in FIG. 15, the article storage racks 1 have storage units 4 for storing the articles B, and wide storage units 4A for storing the wide articles D. The load support tables for storage and delivery also include the load support tables 5 for supporting the articles B, and wide load support tables 5A for supporting the wide articles D.

Figure 14:
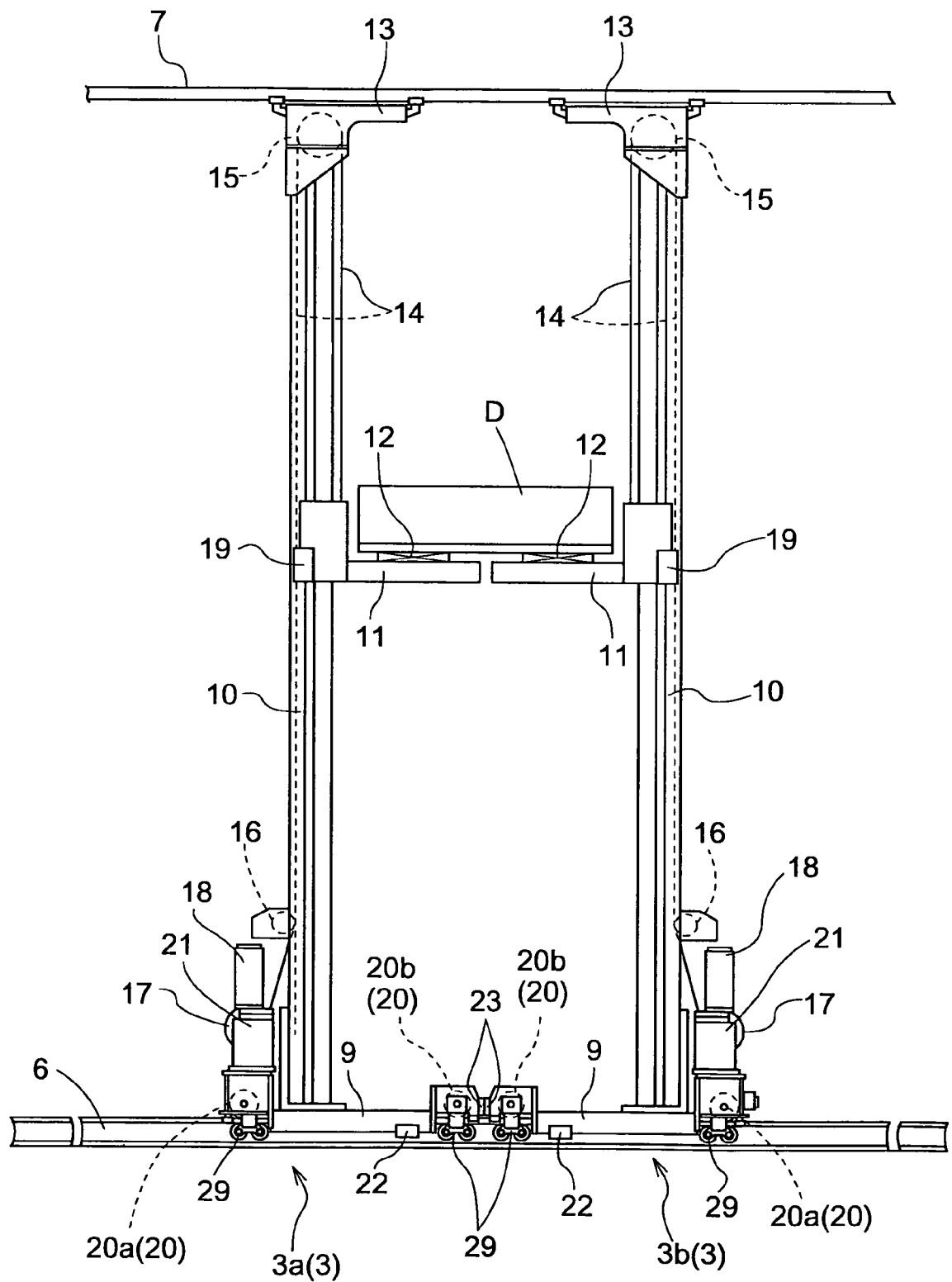
FIG. 14 is a view showing article transport in a different embodiment.

As shown in FIG. 14, the ground controller 8 executes the joint moving operation for controlling operation of the two stacker cranes 3 to move together for article transport, with the rear stacker crane 3 pushing and moving the front stacker crane 3. In this way, the ground controller 8 controls article transport for storing in a wide storage unit 4A a wide article D placed on a wide load support table 5A, and article transport for delivering a wide article D from a wide storage unit 4A to a wide load support table 5A.

(2) The first embodiment described hereinbefore does not specify where the lift units 11 should be located when the ground controller 8 performs the joint moving operation. For example, when performing the joint moving operation, the ground controller 8 may control operation of the two stacker cranes 3 to locate the lift units 11 in the lowermost position in the lifting direction, so that the lift units 11 of the two stacker cranes 3 are in the same position for lifting.

When the rear stacker crane 3 pushes and moves the front stacker crane 3, with the lift units 11 located in the lowermost position in the lifting direction, swinging of the vertical mast 10 of each of the two stacker cranes 3 can be minimized.

(3) The foregoing embodiments include the running rotary encoder 22 for detecting running positions of each carriage 9. For example, a laser range finder may be disposed at an end of the rail track 6 for detecting a distance to the carriage 9 by emitting measuring light to a reflector mounted at an end of the carriage 9, thereby detecting running positions of the carriage 9. In this case, a laser range finder is disposed at one end of the rail track 6 for detecting running positions of the carriage 9 of the first stacker crane 3a, and a laser range finder at the other end of the rail track 6 for detecting running positions of the carriage 9 of the second stacker crane 3b. The two laser range finders input detection information to the ground controller 8.

The lifting position of each carriage 11 may also be detected by such a laser range finder in place of the lifting rotary encoder 19.

(4) In the first embodiment described hereinbefore, the ground controller 8 performs the joint moving operation to control operation of the two stacker cranes 3 to increase the driving torque of the propelling wheel 20a of the rear stacker crane 3 to be greater than that of the propelling wheel 20a of the front stacker crane 3. For example, the joint moving operation may be carried out to control operation of the two stacker cranes 3 to drive the carriage 9 of the rear stacker crane 3 while the brakes of the carriage 9 of the front stacker crane 3 are released for free movement.

That is, in the joint moving operation, the ground controller 8 may drive only the rear stacker crane 3 horizontally rather than driving both the stacker cranes 3 horizontally.

(5) In the embodiments described hereinbefore, each of the two stacker cranes 3 has one running electric motor 21 for rotating the wheels 20. One of the pair of wheels 20 is constructed as propelling wheel 20a and the other as driven wheel. Instead, a running electric motor may be provided for each of the wheels 20, so that both wheels 20 act as propelling wheels.

In the above embodiments, of the pair of wheels 20, the wheel located remote from the adjacent stacker crane 3 is used as propelling wheel 20a. Instead, the wheel 20a close to the adjacent stacker crane 3 may be used as propelling wheel 20a

(6) The foregoing embodiments include two stacker cranes 3 movable forward and backward along the rail track 6. The number of stacker cranes 3 may be varied as appropriate. For example, three stacker cranes 3 may be provided to be movable forward and backward along the rail track 6.

(7) In the foregoing embodiments, the mobile bodies are exemplified by the stacker cranes 3 each having the carriage 9 movable along the rail track 6, the lift unit 11 vertically movable along the vertical mast 10 erected on the carriage 9, and the article transfer device mounted on the lift unit 11. For example, each mobile body may be in the form of an article transport vehicle having a carriage movable along the rail track, and an article transfer device mounted on the carriage.

Varied types of mobile body may be employed for moving forward and backward along the rail track.

(8) In the foregoing embodiments, the transport facility according to this invention is applied to an article storage facility having a plurality of stacker cranes 3. The transport facility is applicable also to an article storage facility having a plurality of article transport vehicles.

Figure 22:
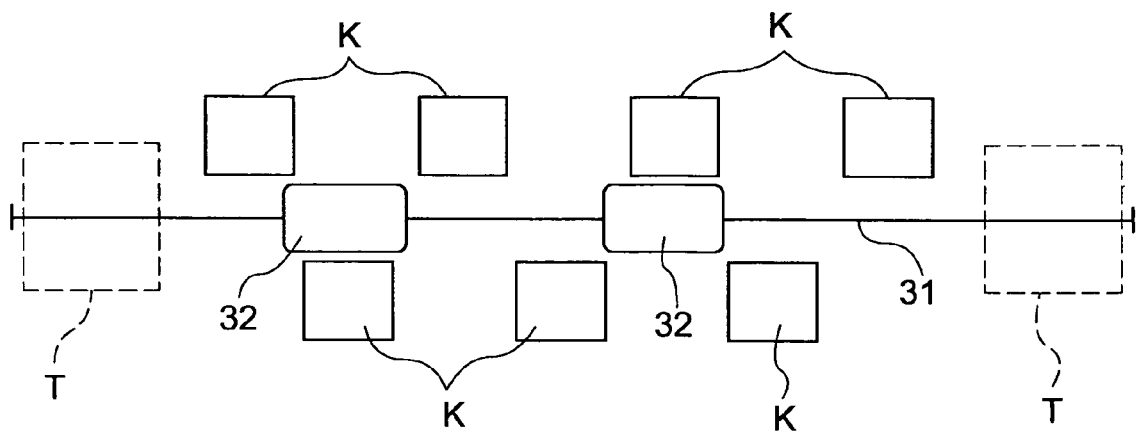
FIG. 22 is a plan view of an article transport facility in another embodiment.
Figure 23:
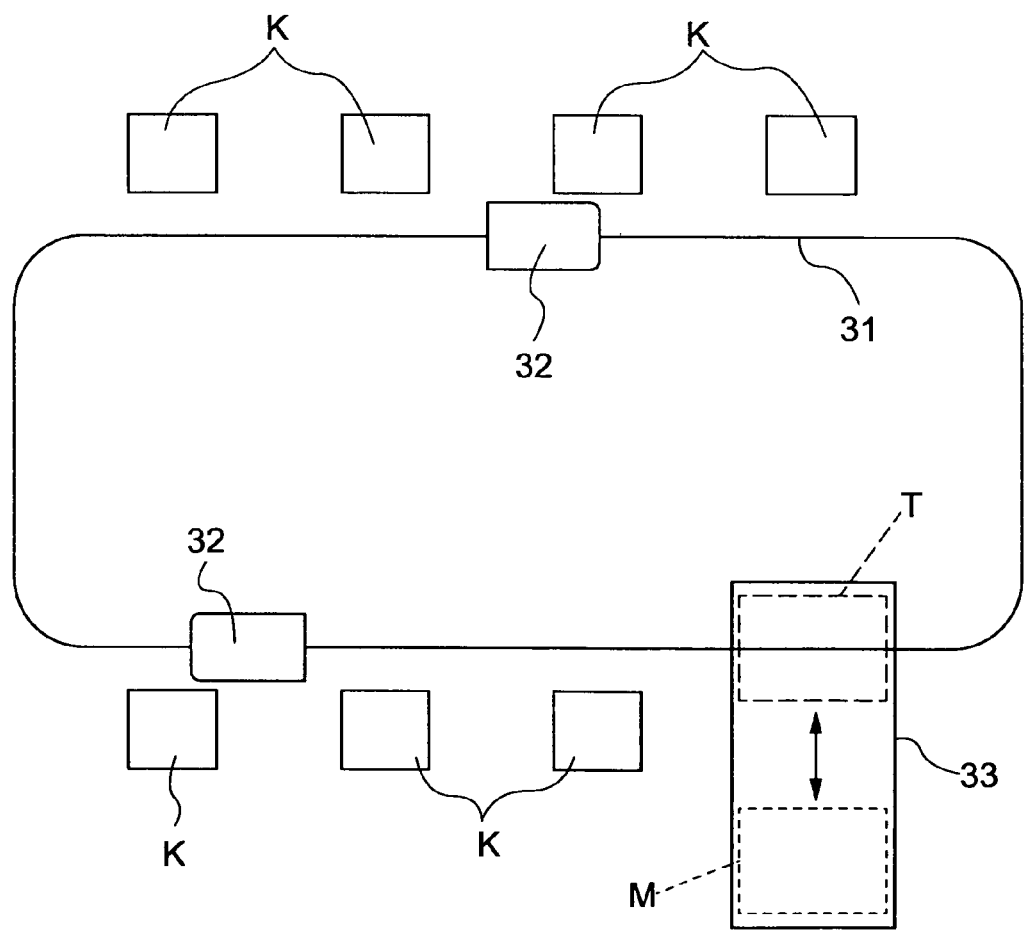
FIG. 23 is a plan view of an article transport facility in another embodiment.

As shown in FIGS. 22 and 23, for example, a track 31 is laid to pass through a plurality of article transfer locations K, and a plurality of article transport vehicles 32 are provided to act as mobile bodies for article transport movable on the track 31. FIGS. 22 and 23 show two article transport vehicles 32 each. Instead, three or more article transport vehicles 32 may be provided.

In the arrangement shown in FIG. 22, the track 31 is formed linear, and the article transport vehicles 32 are moved forward and backward to transport articles between the plurality of article transfer locations K. This arrangement includes retreat areas T at opposite ends of the track 31.

In the arrangement shown in FIG. 23, the track 31 is in loop form, and the article transport vehicles 32 are moved in one direction to transport articles between the plurality of article transfer locations K. This arrangement includes a retreat area T in part of the track 31. The retreat area T has a shunt device 33 for horizontally moving an article transport vehicle 32 between the retreat area T and a maintenance area M. Although not shown, the shunt device 33 horizontally moves two rails for horizontally moving an article transport vehicle 32 between the retreat area T and maintenance area M. When one article transport vehicle 32 is located in the maintenance area M, the other article transport vehicle 32 is allowed to pass through the retreat area T by the remaining rail.

(9) In the second embodiment described hereinbefore, the control device H performs the retreating operation in response to abnormality information from one of the crane control devices 30. The control device H may be constructed to perform the retreating operation based on a retreat instruction for performing the retreating operation.

For example, upon receipt of abnormality information from one of the crane control devices 30, the control device H performs an abnormality reporting operation for reporting the abnormality. Then, the operator transmits a retreat instruction through a manually operable instruction device. On the retreat instruction, the control device H performs the retreating operation.

(10) In the second embodiment described hereinbefore, the control device H, in performing the retreating operation, controls the operation of the stacker crane 3 in normal condition, for causing the stacker crane 3 in normal condition to move horizontally at the transport speed up to the slowdown position G, and to move horizontally at the retreating speed from the slowdown position G until the stacker crane 3 in the abnormal condition moves to the retreat area T. However, in the treating operation, the stacker crane 3 in normal condition may be moved horizontally at a varied speed as appropriate.

(11) In the foregoing embodiments, a single vertical mast 10 is erected on the carriage 9 for guiding and supporting the lift unit 11 in vertical movement. A varied number of vertical masts 10 may be erected on the carriage 9. For example, a vertical mast 10 may be erected at each of the opposite ends of the carriage 9 in the direction of horizontal movement.

What is claimed is:

1. An article transport facility comprising:
a plurality of mobile bodies movable along a single track for transporting articles;
an article storage rack disposed beside said track and including a plurality of storage units arranged vertically and in juxtaposition in a direction along said track;
a plurality of load support tables arranged in juxtaposition in the direction along said track at positions adjacent said article storage rack in the direction along said track;
a control means capable of executing an individual moving operation for controlling movements of said mobile bodies individually of each other where the mobile bodies are separated from each other;
wherein said control means executes a joint moving operation for controlling respective running of two of said plurality of mobile bodies to cause these two mobile bodies to run together provided said two mobile bodies are running in a same direction and being under normal operating conditions and provided a distance between said two mobile bodies is less than a predetermined distance;
wherein, in the joint moving operation, a first mobile body as one of said two mobile bodies which is located rearwards in the running direction pushes a second mobile body as the other of said two mobile bodies which is located forwards in the running direction; and
wherein said predetermined distance is either a distance between said two mobile bodies when these bodies are located at positions corresponding, respectively, to two of said storage units which are directly next to each other in the direction along said track, or a distance between said two mobile bodies when these bodies are located at positions corresponding, respectively, to two of said load support tables which are directly next to each other in the direction along said track.

2. An article transport facility as defined in claim 1, wherein said control means executes said joint moving operation by causing a driving torque of a propelling wheel of said first mobile body to be greater than a driving torque of a propelling wheel of said second mobile body.

3. An article transport facility as defined in claim 1, wherein:
each of said mobile bodies is a stacker crane including a carriage having a pair of front and rear wheels for running along said track, a lift unit vertically movable along a vertical mast erected on said carriage, and an article transfer device mounted on said lift unit;
said vertical mast is erected in an area substantially remote from an end of said carriage closer to an adjacent mobile body; and
one of the pair of front and rear wheels of said carriage, located remote from the adjacent mobile body, acts as a propelling wheel.

4. A method of operating an article transport facility, the article transport facility having a plurality of mobile bodies movable along a single track for transporting articles, and comprising:
an article storage rack disposed beside said track and including a plurality of storage units arranged vertically and in juxtaposition in a direction along said track;
a plurality of load support tables arranged in juxtaposition in the direction along said track at positions adjacent said article storage rack in the direction along said track;
a control means capable of executing an individual moving operation for controlling movements of said plurality of mobile bodies individually of each other where the mobile bodies are separated from each other;
the method comprising the steps of:
deciding to execute a joint moving operation for controlling respective running of two of said plurality of mobile bodies to cause these two mobile bodies to run together provided said two mobile bodies are running in a same direction and being under normal operating conditions and provided a distance between said two mobile bodies is less than a predetermined distance; and executing, in response to the decision, a joint moving operation, to cause a first mobile body as one of said two mobile bodies which is located rearwards in the running direction to come into contact with and then push a second mobile body as the other of said two mobile bodies which is located forwards in the running direction;

wherein said predetermined distance is either a distance between said two mobile bodies when these bodies are located at positions corresponding, respectively, to two of said storage units which are directly next to each other in the direction along said track, or a distance between said two mobile bodies when these bodies are located at positions corresponding, respectively, to two of said load support tables which are directly next to each other in the direction along said track.

5. A method as defined in claim 4, wherein, in the step of causing said first mobile body to push said second mobile body, causing a driving torque of a propelling wheel of said first mobile body to be greater than a driving torque of a propelling wheel of said second mobile body.

6. A method as defined in claim 4, wherein each of said mobile bodies is a stacker crane including a carriage having a pair of front and rear wheels for running along said track, a lift unit vertically movable along a vertical mast erected on said carriage, and an article transfer device mounted on said lift unit;

said vertical mast is erected in an area substantially remote from an end of said carriage closer to an adjacent mobile body; and one of the pair of front and rear wheels of said carriage, located remote from the adjacent mobile body, acts as a propelling wheel, and the step of moving said first mobile body includes a step of controlling drive of said propelling wheel.

* * * * *